United States Patent
Featonby et al.

(10) Patent No.: US 12,028,268 B1
(45) Date of Patent: Jul. 2, 2024

(54) FALLBACK CAPACITY PROVIDERS FOR CAPACITY MANAGEMENT OF WORKLOAD INFRASTRUCTURE

(71) Applicant: Amazon Technologies, Inc., Seattle, WA (US)

(72) Inventors: Malcolm Featonby, Sammamish, WA (US); Derek J Petersen, Seattle, WA (US); Abhishek Nautiyal, Seattle, WA (US); Li chieh Young, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 6 days.

(21) Appl. No.: 18/082,779

(22) Filed: Dec. 16, 2022

(51) Int. Cl.
*H04L 47/78* (2022.01)
*H04L 47/74* (2022.01)

(52) U.S. Cl.
CPC .......... *H04L 47/781* (2013.01); *H04L 47/745* (2013.01); *H04L 47/746* (2013.01)

(58) Field of Classification Search
CPC ... H04L 47/745; H04L 47/746; H04L 47/781; H04L 47/748; H04L 41/0826; H04L 63/126; H04L 67/1095; G06F 11/2023; G06F 8/10; G06F 9/5011; G06F 9/505; G06Q 10/10; G07F 17/3234
See application file for complete search history.

(56) References Cited

U.S. PATENT DOCUMENTS

| | | | |
|---|---|---|---|
| 9,582,377 B1 * | 2/2017 | Dhoolam | G06F 9/5011 |
| 11,106,551 B1 * | 8/2021 | Featonby | G06F 11/2023 |
| 2019/0386897 A1 * | 12/2019 | Gundra | G06F 8/10 |
| 2021/0118054 A1 * | 4/2021 | Turner | G06Q 10/10 |
| 2022/0156661 A1 * | 5/2022 | Xu | H04L 41/0826 |
| 2022/0197773 A1 * | 6/2022 | Butler | G06F 9/505 |
| 2023/0035443 A1 * | 2/2023 | Harpur | G07F 17/3234 |
| 2023/0084799 A1 * | 3/2023 | Gupta | H04L 47/748 |
| | | | 709/226 |
| 2023/0121384 A1 * | 4/2023 | Bogatin | H04L 67/1095 |
| | | | 709/219 |
| 2023/0412507 A1 * | 12/2023 | Shevade | H04L 63/126 |

* cited by examiner

*Primary Examiner* — Le H Luu

(74) *Attorney, Agent, or Firm* — Lee & Hayes, P.C.

(57) ABSTRACT

Techniques implemented by a cloud computing system for providing fallback capacity providers to ensure that infrastructure capacity required to run containerized services is available despite primary capacity providers experiencing a failure. Cloud providers offer container-management services that automate the management and scaling of containerized services of users. The container-management services are supported by capacity providers that manage the computing infrastructure on which the containerized services run (e.g., servers, VMs, etc.). However, there are times when a capacity provider is unable to provision capacity for containerized services, such as due to a large scale failure. Rather than leaving capacity requests unserved, the container-management service designates a fallback capacity provider that acts as a failover for provisioning requested infrastructure capacity. The fallback capacity providers have different provisioning paths than the primary capacity providers, and thus different availability postures and failure modes, to ensure resiliency in provisioning capacity for containerized services.

20 Claims, 14 Drawing Sheets

400

CONFIGURE SERVICE

402 →
A service lets you specify how many copies of your task definition to run and maintain in a cluster. The container-management service maintains the number of tasks and coordinates task scheduling.

404 →

Task Definition — ProductionTask ▼

406 →

Capacity provider strategy

| Primary Provider 1 | CP-VM160141 ▼ | Base | 1 | Weight | 1 |
| Primary Provider 2 | CP-VM184024 ▼ | Base | 0 | Weight | 4 |
| Fallback Provider  | FallbackCapacityProv... ▼ |

+ Add another provider

408 →

Cluster — ProductionCluster ▼

410 →

Service name — httpd_service

412 →

Number of tasks — 15

414 →

Minimum health percent — 0

416 →

Maximum percent — 200

Cancel    Apply
418

FIG. 4

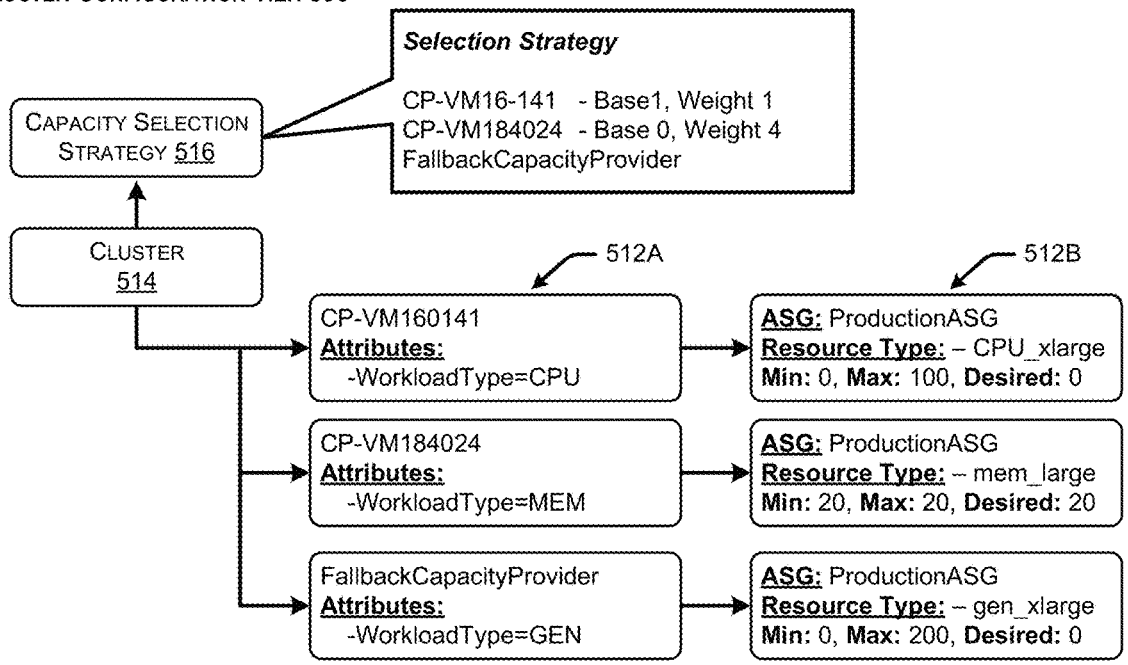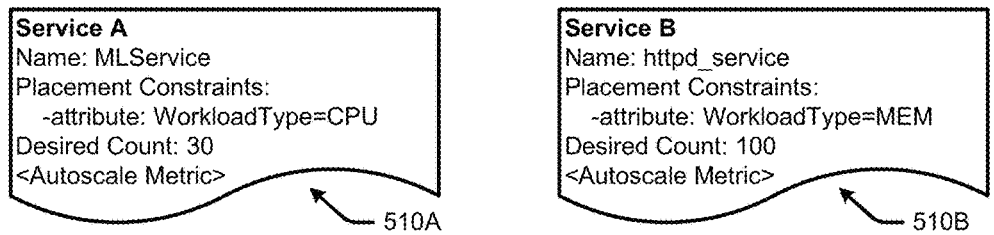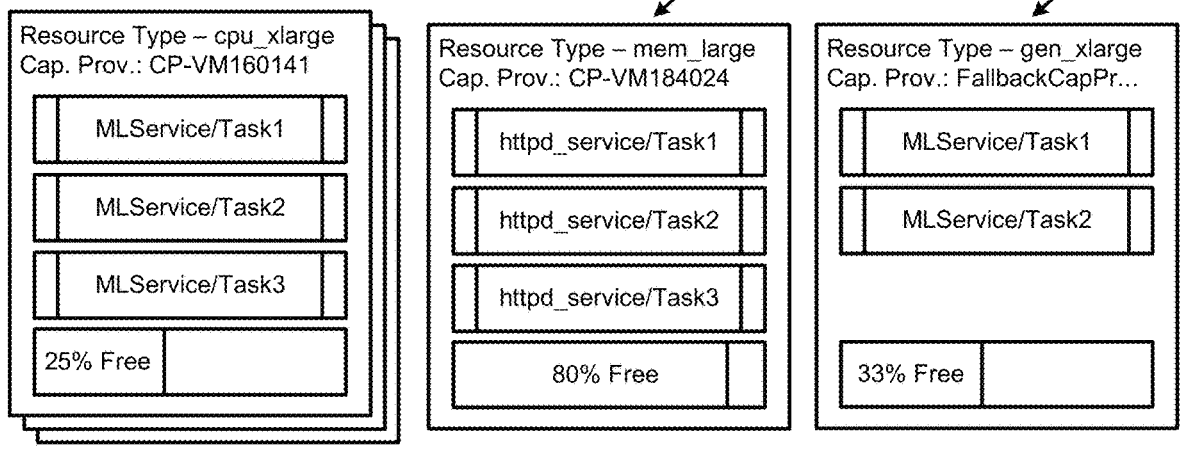
FIG. 5

FALLBACK CAPACITY PROVIDERS FOR CAPACITY MANAGEMENT OF WORKLOAD INFRASTRUCTURE

BACKGROUND

Cloud computing providers offer cloud-based services to fulfill users' computing-service needs without the users having to invest in and maintain computing infrastructure required to implement their services. These cloud providers maintain networks of managed computing resources and functionality to implement various types of scalable, on-demand services, to support applications of the users. Specifically, the cloud providers maintain networks of data centers, which in turn may include a number of interconnected computing devices (or "servers"), that provide computing resources to support applications or services of the users. To increase the utilization of the physical computing resources, virtualization technologies allow a single physical computing device to host multiple virtual computing resources. For example, a single computing device can host multiple instances of virtual machines (VM) (also referred to herein as "virtual machine instances" or "VM instances") that appear and operate as independent physical computing devices for users, but each share or are allocated portions of the computing resources of the single, underlying physical computing device. Even further, virtualization allows for a VM to host multiple containers, or virtual runtime environments, that share a single operating system (OS) of a VM.

In addition to providing different types of compute options, such as VMs and containers, cloud providers also provide various management services that automate the scaling and management of these compute options. For instance, cloud providers offer container-management services that users can utilize to run, stop, and manage their containers on clusters that run their services. Further, cloud providers offer capacity providers that assist users by taking on the burden of provisioning the underlying computing infrastructure (e.g., servers, VMs, etc.) on which the containers run. However, due to the vast range of services that cloud providers run on behalf of users, various challenges arise when managing and providing for the differing compute needs of those services.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a user interface through which a user of a container-management service can assign a fallback capacity provider to act as a failover to provision infrastructure capacity for a service.

FIG. 5 illustrates a representation of example tiers of a service that utilizes a fallback capacity provider as a failover to provide infrastructure capacity when a primary capacity provider is unable.

DETAILED DESCRIPTION

Figure 1:
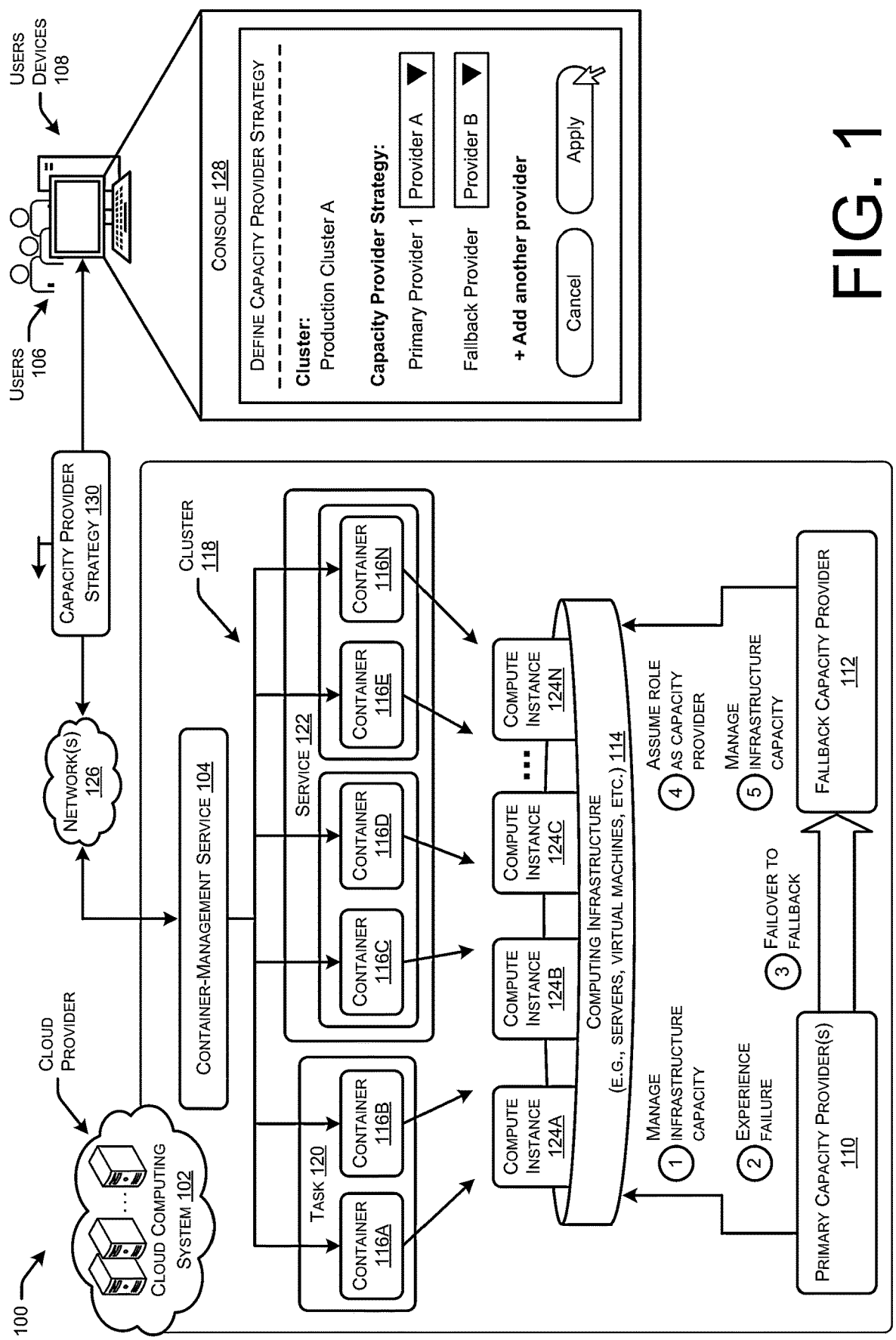
FIG. 1 illustrates a system-architecture diagram of an example environment in which a fallback capacity provider is implemented as a failover to provision infrastructure capacity for containers running a service when a primary capacity provider experiences a failure.

This disclosure describes techniques implemented by a cloud computing system to provide users with fallback capacity providers to ensure that computing capacity required to run containerized services is available despite a primary capacity provider experiencing a failure. Cloud providers offer container-management services that automate the management and scaling of containerized services of users. The container-management services are supported by various capacity providers that are used to manage the computing infrastructure on which the containerized services run (e.g., servers, VMs, etc.). However, there are times when a capacity provider is unable to provision capacity for containerized services of users, such as due to a large scale failure. Rather than simply being unable to service capacity requests to support scaling of containerized services, the container-management service may designate a fallback capacity provider that acts as a failover to ensure containerized services have access to needed compute infrastructure. The fallback capacity providers have different provisioning paths than the primary capacity providers, and thus different availability postures and failure modes, to ensure resiliency in providing capacity for containerized services.

Cloud computing systems provide container-management services that automate the management of containers that run services and tasks of users. Generally, a service ran on behalf of a user is defined as a set of tasks that run simultaneously in a logical group called a "cluster." Containers are provisioned to run tasks of the service, and the container-management service can scale the number of containers based on the needs of the service. For instance, the container-management service may launch additional containers to support a service that is experiencing, or is predicted to experience, an increase in activity. Conversely, the container-management service may stop or tear down containers that are not being used by a service that has experienced a decrease in activity. However, as the number of containers launched by the container-management service scales upwards, the capacity of the underlying computing infrastructure supporting the clusters similarly needs to increase or scale upwards.

Capacity providers are used by the container-management service to manage the infrastructure on which the containers in the clusters run. Generally, each cluster has one or more capacity providers to manage their underlying computing infrastructure. A cloud system may offer different types of capacity providers, such as a serverless compute provider, a scalable VM instance provider, an interruption-tolerant infrastructure provider, and so forth. Users may select a capacity provider that provisions computing infrastructure that is appropriately tailored or suitable for the needs of their services. For instance, some users may prefer a more managed experience and select a serverless compute platform where they do not need to configure the underlying infrastructure, while other users may prefer an interruption-tolerant infrastructure provider for services that can handle some interruption for a reduction in cost.

According to the techniques described herein, the container-management service may further determine fallback capacity providers for the clusters that include the services and tasks of users. In some examples, the container-management service may simply prompt users to select fallback capacity providers via a console or other interface. The users may select their primary, or default, capacity provider(s) and may further select and designate their fallback capacity providers. In some instances, the users can opt into an option for a managed creation or selection of fallback capacity providers. Under the managed option, the container-management service may automatically create and configure the fallback capacity provider to manage the infrastructure of the clusters based on resource consumption of the tasks and services running in the cluster and/or the configurations of the primary capacity provider. In other examples, the container-management service may provide a dynamic creation option that users may opt into for dynamic and automated selection a fallback capacity provider. Under the dynamic option, the container-management service may intelligently, and in real-time, determine a fallback capacity provider for a cluster responsive to a primary capacity provider being unable to provision capacity.

In examples where a user requests that the container-management service determine a suitable fallback capacity provider on behalf of the user, the container-management service may obtain and analyze utilization characteristics of the service. For instance, the container-management service may analyze utilization data and determine amounts of computing resources consumed by the service (e.g., computer processing unit (CPU) consumed, memory consumed, storage consumed, etc.). The container-management service may determine various utilization metrics, such as average amounts of resources consumed, maximum amounts of resources consumed, etc. The container-management service may utilize this data to select a suitable fallback capacity provider, and/or configurations for the fallback capacity provider, for the service and/or cluster of the user. Further, the container-management service may use the primary capacity provider as a source of information for selecting a suitable fallback capacity provider.

As an illustrative example of selecting a fallback capacity provider, the container-management service may determine that the amount of computing resources utilized by a particular task or service indicate a need for a VM instance that is allocated 8 vCPUs, 32 gibibytes (GiB) of memory, and 10 Gbps of network bandwidth. Further, the container-management service may determine that the primary capacity provider is a serverless compute platform that supplies compute infrastructure that is highly available, and determine that a fallback capacity provider that provides interruptible compute infrastructure would not be suitable for the cluster. In such examples, the container-management service may select a scalable, highly available VM instance platform as the fallback capacity provider. Further, the container-management service may configure the fallback capacity provider to provision VM instances that provide at least the required amount of computing resources used by the service.

Once the primary and fallback capacity providers have been selected, the primary capacity provider may be utilized to manage the computing infrastructure using a capacity provider strategy. As described herein, the capacity providers may perform various operations for managing the underlying computing infrastructure. For instance, the capacity providers may provision capacity, which may include one or more of launching VM instances, allocating pre-launched VM instances for use by a cluster, spinning up or allocating use of physical devices (such as servers), or otherwise allocating virtual and/or physical computing resources for use by a cluster, task, service, and so forth. Further, the capacity providers may remove or reduce capacity, such as by removing or spinning down compute, allocating compute away from the computing infrastructure, and/or otherwise lessening the amount of computing resource capacity in the computing infrastructure (e.g., CPU, memory, networking, storage, GPU, etc.). Additional operations may be managed by the capacity providers, such as auto-scaling groups and strategies, installing updates or upgrades, recycling of compute instances, monitoring the health of compute instances, and so forth.

The capacity provider strategy determines how the tasks are spread across the cluster's primary capacity providers. When a user runs a standalone task or creates a service, the user may either use the cluster's default capacity provider strategy or specify a capacity provider strategy that overrides the cluster's default strategy. The primary capacity provider(s) may provision compute of a particular type and configuration in response to receiving capacity requests from the container-management service (or other entity), and may tear down, stop running, or otherwise remove capacity from computing infrastructure that is not being used by a cluster (e.g., a task or service).

In some instances, various parameters or configurations may be specified for finer control of a capacity provider. For instance, optional values may be specified, such as a base value that designates how many tasks, at a minimum, to run on the specified capacity provider, and/or a weight value that designates the relative percentage of the total number of launched tasks that should use the specified capacity provider. For example, if a user has a strategy that contains two capacity providers, and both have a weight of 1, then when the base is satisfied, the tasks will be split evenly across the two capacity providers. Using that same logic, if a user specifies a weight of 1 for capacity provider A and a weight of 4 for capacity provider B, then for every one task that is run using capacity provider A, four tasks would use capacity provider B.

The primary capacity providers may continue to manage the computing infrastructure on which the cluster runs, and the fallback capacity provider (and/or the container-management service) may monitor to detect events that indicate the primary capacity provider(s) are unable to provision capacity. For instance, the fallback capacity provider may monitor for an event where a task or service has insufficient capacity to be launched, capacity requests are not being served, and/or other events indicating that the primary capacity provider(s) have experienced a failure or are otherwise unable to provision needed capacity.

Upon determining that the primary capacity provider(s) are unable to provision capacity, the fallback capacity provider may begin provisioning capacity for the infrastructure of the cluster. For instance, the fallback capacity provider may launch a compute platform for the task launch, or otherwise service the capacity request, and continue to service subsequent capacity requests. In this way, services and tasks on a cluster may continue to be able to scale using the fallback capacity provider despite the primary capacity provider experiencing a failure or otherwise being unable to provision capacity. In some instances, once the primary capacity provider is again able to provision capacity (e.g., fault has cleared), the primary capacity provider may take over provisioning capacity for the cluster and the fallback capacity provider may quit provisioning capacity and return to monitoring the capacity to detect issues.

The fallback capacity provider may begin provisioning capacity in response to detecting various events. As explained, the container-management service may cause the fallback capacity provider to being provisioning capacity in response to determining that the primary capacity provider is unable (e.g., experienced a failure, lack of available computing resources of a required type, etc.). However, other events detected by the container-management service may cause the service to select the fallback capacity provider for provisioning capacity. For instance, the container-management service may detect that the primary capacity provider is failing in terms of monitored metrics (e.g., amount of available capacity). As another example, the container-management service may determine to proactively move away from the primary capacity provider, and being weighting capacity requests and traffic away from the primary capacity provider and towards the fallback capacity provider.

Generally, the primary capacity providers and fallback capacity providers have different provisioning paths, and thus different availability postures and failure modes, to ensure resiliency in providing capacity for containerized services. That is, a fallback capacity provider may be selected, or determined as suitable, as a failover for a primary capacity provider because a same fault will not affect the provisioning paths of both providers.

In some instances, the container-management service may validate that the fallback capacity provider is suitable to serve as a failover for the primary capacity provider before using the fallback capacity provider. For instance, the container-management service may verify that the compute platform provided by the fallback capacity provider provides sufficient resources to support tasks of the cluster, verify that the fallback capacity provider has a different provisioning path and fault domain as compared to the primary capacity provider, and so forth.

The fallback capacity providers described herein increase the resiliency of container-management services that manage services and tasks of users. Rather then being unable to provision capacity for computing infrastructure supporting services in a cloud network, the fallback providers provide a suitable alternative for services to use in the event primary capacity provider experience a failure or other issue. Thus, the techniques described herein solve a technical problem rooted in technology (e.g., availability and resiliency of computing resources) using a solution rooted in technology.

The techniques described herein are with reference to a cloud provider network or system and a container-management service. However, the techniques are equally applicable to any network or environment, and for any computing service. For example, the techniques are equally applicable for other service provider networks, on-premises networks, and so forth. Further, the techniques are equally applicable for different services beyond a container-management service. For instance, the techniques are applicable for other virtualization services, such as VM management services for which servers are brought online and offline, and/or other types of services.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a fallback capacity provider is implemented as a failover to provision infrastructure capacity for containers running in a cloud computing system 102 when a primary capacity provider experiences a failure.

The cloud computing system 102 may be operated and/or managed by a cloud provider and may provide various services to users to fulfil their computing resource needs, such as cloud-based computing resources. Users 106 may operate user devices 108 in order to register for use of the computing resources of the cloud computing system 102. The cloud computing system 102 may include a container-management service 104 that includes components for managing containers to execute tasks or services on behalf of users 106. Generally, the container-management service 104 may be, at least partly, a control-plane system that controls operations occurring in the cloud computing system 102. The container-management service 104 may be either centralized, or distributed, and be supported by one or more computing devices.

As illustrated, a cloud computing system 102 may be operated and/or managed by a cloud provider. The cloud computing system 102 may provide various services to users to fulfil their computing resource needs, such as cloud-based computing resources. For example, the cloud computing system 102 may provide cloud-based, scalable, and network accessible compute power services, storage services, database services, and/or other services. Users 106 may utilize user devices 108 to subscribe for use of the computing resources and/or services provided by the cloud computing system 102.

Generally, the cloud computing system 102 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud computing system 102 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud computing system 102 (or "cloud provider network"). Preferably, availability zones within a region are positioned far enough away from one other that the same natural disaster should not take more than one availability zone offline at the same time. Users 106 can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud computing system 102 may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud computing system 102 may provide on-demand, scalable computing services to users 106 through a network, for example allowing users 106 to have at their disposal scalable "virtual computing devices" via their use of the compute servers and block store servers. These virtual computing devices have attributes of a personal computing device including hardware (various types of processors, local memory, random access memory ("RAM"), hard-disk and/ or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users 106 to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user 106, the hardware associated with the virtual computing devices can be scaled up or down depending upon the resources the user 106 requires. Users 106 can choose to deploy their virtual computing systems to provide network-based services for their own use and/or for use by their users or client.

The cloud computing system 102 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users 106 of the cloud computing system 102, which may be provisioned in user accounts.

The cloud computing system 102 may offer many different built-in services to the users 106 to help run their applications and services. For instance, the cloud computing system 102 may provide users 106 with use of virtual private clouds (VPCs), which are logically isolated sections of the cloud computing system 102 that serve as private virtual environments to which only permitted users 106 have access to use. Users 106 may have multiple VPCs, potentially spanning across different regions of the cloud computing system 102. To help interconnect VPCs and other resources of the user's computing infrastructure, the service provider may also offer many different built-in networking services. The VPCs may be used by the users 106 to create subnetworks, configure personalized route tables, choose IP addresses, monitor connections, screen network traffic, restrict access into the VPCs 112, and/or for other operations. The VPCs include or run computing resources, such as servers, virtual machines (VMs), containers, serverless functions, workloads, processes, etc. Generally, the computing resources are used to support or run applications or services of the users 106.

Users 106 of the cloud computing system 102 may use cloud computing resources to run various tasks and/or services. Rather than manage the runtime environments for these tasks and services, the user 106 may register for use of various automated services provided by the cloud computing system 102. For instance, users 106 may register for use of a container-management service 104, which is a highly scalable and fast container management service. Users 106 can use the service 104 to run, stop, and manage containers on a cluster. The container-management service 104 may utilize various capacity providers 110 to manage the computing infrastructure 114 that the tasks in the clusters use. The capacity providers 110 help users 106 simplify and automate infrastructure operations, and focus on building services and applications rather than managing infrastructure 114.

Thus, the container-management service 104 may be used to automate the management of containers 116 that run services 122 and tasks 120 of users 106. Generally, a service 122 ran on behalf of a user 106 is defined as a set of tasks 120 that run simultaneously in a logical group called a cluster 118. Containers 116 are provisioned to run tasks 120 of the service 122, and the container-management service 104 can scale the number of containers 116 provisioned based on the needs of the service 122. For instance, the container-management service 104 may launch additional containers 116 to support a service 122 that is experiencing, or is predicted to experience, an increase in activity, and may stop or tear down containers 116 that are not being used by a service 122 that has experienced a decrease in activity. However, as the number of containers 116 launched by the container-management service 104 scales up, the capacity of the underlying computing infrastructure 114 supporting the cluster 118 similarly needs to increase or scale up.

The capacity providers 110 are used by the container-management service 104 to manage the infrastructure 114 on which the containers 116 in the clusters 118 run. Generally, each cluster 118 has one or more capacity providers 110 to manage the computing infrastructure 114. The computing infrastructure 114 may include various compute instances 124, such as VM instances 124, server instances 124, virtual server instances 124, and/or other types of computing infrastructure on which containers 116 run.

The cloud computing system 102 may offer different types of capacity providers 110/112 that are used in a capacity provider strategy to determine the infrastructure 114 that a task 120 runs on. The cloud computing system 102 may offer a serverless compute provider 110 where the users 106 do not need to manage servers, handle capacity planning, or isolate container workloads for security. The serverless compute provider 110 handles the infrastructure management aspects of the users' workloads, and can be used to schedule the placement of containers 116 across a cluster 118 based on the resource needs, isolation policies, and availability requirements. The serverless compute provider 110 may be automated such that users 106 do not need to make decisions regarding the underlying infrastructure 114, and may be optimal for large workloads that need to be optimized for low overhead, small workloads that have occasional burst, tiny workloads, and/or batch workloads The cloud computing system 102 may additionally, or alternatively, offer a scalable VM instance provider 110 that provides scalable computing capacity and infrastructure using VM instances 124 configured by the user account 106. The scalable VM instance provider 110 may be used to launch as many or as few virtual servers as needed, configure security and networking, and manage storage. The scalable VM instance provider 110 enables users 106 to scale up or down to handle changes in requirements or spikes in popularity, reducing your need to forecast traffic. Generally, users 106 are able to define or configure the computing infrastructure 114 provisioned by the scalable VM instance provider 110, such as defining auto-scaling groups, settings for managed scaling and unmanaged termination protection, selections of VM instance types to be used, etc.

The cloud computing system 102 may additionally, or alternatively, offer an on-premises infrastructure provider 110 that is configured to provision on-premises infrastructure to support on-premises containers 116 running on clusters 118 in an on-premises network associated with the user account. Further, the cloud computing system 102 may additionally, or alternatively, offer an edge infrastructure provider 110 that is configured to automate management of edge computing infrastructure on which an edge cluster runs (e.g., data center located at an edge of the cloud computing system 102). Further, the cloud computing system 102 may additionally, or alternatively, offer an interruption tolerant infrastructure provider 110 that is configured to manage computing infrastructure for containers supporting interruption-tolerant workloads. The interruption tolerant infrastructure provider 110 may be useful for users 106 that have workloads or services that can tolerate interruptions to optimize cost. The interruption tolerant infrastructure provider 110 may utilize spare capacity in the cloud computing system 102 to run tasks 120, and tasks 120 are launched when capacity is available based on the specified capacity request.

According to the techniques described herein, the container-management service 104 may further determine fallback capacity providers 112 for the clusters 118 including the services 122 and tasks 120 of users 106. As shown in FIG. 1, the container-management service 104 may simply prompt users 106 to select a fallback capacity provider 112 via a console 128 or another interface. The users 106 may select their primary, or default, capacity provider(s) 110 and may further select and designate their fallback capacity provider 112. When the user 106 is finished and applies their choices, a capacity provider strategy 130 is sent to the container-management service 104 that dictates the primary capacity provider 110 and the fallback capacity provider 112.

However, in some instances, the users 106 can opt into a managed creation or selection of a fallback capacity provider 112. Under the managed option, the container-management service 104 may automatically create and configure the fallback capacity provider 112 to manage the infrastructure 114 of the cluster 118 based on resource consumption of the tasks 120 and services 122 running in the cluster 118 and/or the configurations of the primary capacity provider 110. In other examples, the container-management service 104 may provide a dynamic creation option that users 106 may select for selection a fallback capacity provider 112. Under the dynamic option, the container-management service 104 may intelligently and in real-time determine a fallback capacity provider for a cluster 118 responsive to a primary capacity provider 110 being unable to provision capacity.

In examples where a user 106 requests that the container-management service 104 determine a suitable fallback capacity provider 112 on behalf of the user 106, the container-management service 104 may obtain and analyze utilization characteristics of the service 122. For instance, the container-management service 104 may analyze utilization data and determine amounts of computing resources consumed by the service 122 (e.g., computer processing unit (CPU) consumed, memory consumed, storage consumed, etc.). The container-management service 104 may determine various utilization metrics, such as average amounts of resources consumed, maximum amounts of resources consumed, etc. The container-management service 104 may utilize this data to select a suitable fallback capacity provider 112, and/or configurations for the fallback capacity provider 112, for the service 122 and cluster 118 of the user 106. Further, the container-management service 104 may use the primary capacity provider 110 as a source of information for selecting a suitable fallback capacity provider 112.

As an illustrative example of selecting a fallback capacity provider 112, the container-management service 104 may determine that the amount of computing resources utilized by a particular task 120 or service 122 requires a VM instance that is allocated 8 vCPUs, 32 gibibytes (GiB) of memory, and 10 Gbps of network bandwidth. Further, the container-management service 104 may determine that the primary capacity provider 110 is a serverless compute platform that supplies compute infrastructure that is highly available, and determine that a fallback capacity provider 112 that provides interruptible compute infrastructure would not be suitable for the cluster 118. In such examples, the container-management service 104 may select a scalable, highly available VM instance platform as the fallback capacity provider 112. Further, the container-management service 104 may configure the fallback capacity provider 112 to provision VM instances 124 that provide at least the required amount of computing resources used by the service 122.

Once the primary and fallback capacity providers 110/112 have been selected, the primary capacity provider 110 may be utilized to manage the computing infrastructure 114 using the capacity provider strategy 130. The capacity provider strategy 130 defines how the tasks 120 are spread across the cluster's 118 primary capacity providers 110. When a user 106 runs a standalone task 120 or creates a service 122, the user 106 may either use the cluster's 118 default capacity provider strategy 130 or specify a capacity provider strategy 130 that overrides the cluster's default strategy 130, The primary capacity provider(s) 110 may provision compute of a particular type and configuration in response to receiving capacity requests from the container-management service 104 (or other entity), and may tear down, stop running, or otherwise remove capacity from computing infrastructure 124 that is not being used by a cluster 118 (e.g., a task or service).

In some instances, various parameters or configurations may be specified for finer control of a capacity provider 110/112. For instance, optional values may be specified, such as a base value that designates how many tasks, at a minimum, to run on the specified capacity provider 110/112, and/or a weight value that designates the relative percentage of the total number of launched tasks that should use the specified capacity provider. For example, if a user 106 has a strategy that contains two capacity providers 110, and both have a weight of 1, then when the base is satisfied, the tasks will be split evenly across the two capacity providers 110. Using that same logic, if a user 106 specifies a weight of 1 for capacity provider A and a weight of 4 for capacity provider B, then for every one task that is run using capacity provider A, four tasks would use capacity provider B.

At "1," the primary capacity provider(s) 110 may continue to manage the computing infrastructure 114 on which the cluster 118 runs, and the fallback capacity provider 112 (and/or the container-management service 104) may monitor to detect events that indicate the primary capacity provider(s) 110 are unable to provision capacity. For instance, the fallback capacity provider 112 may monitor for an event where a task 120 or service 122 has insufficient capacity to be launched, capacity requests are not being served, and/or other events indicating that the primary capacity provider(s) 110 have experienced a failure or are otherwise unable to provision needed capacity.

At "2", the primary capacity provider 110 may experience a failure, or other event, that prevents the primary capacity provider 110 from being able to provision capacity into the computing infrastructure 114. Upon determining that the primary capacity provider(s) 110 are unable to provision capacity, the capacity management may failover to the fallback capacity provider at "3." That is, the fallback capacity provider 112 may determine, or be instructed by the container-management service 104, to act as the primary capacity provider for the computing infrastructure 114 and handle the management of some or all of operations that the primary capacity provider 110 is unable to handle.

At "4," the fallback capacity provider 112 may assume the role as the primary capacity provider and at "5," may begin provisioning capacity for the infrastructure 114 of the cluster 118. For instance, the fallback capacity provider 112 may launch a compute instance 124 for a requested task launch, or otherwise service a capacity request, and continue to service subsequent capacity requests. In this way, services 122 and tasks 120 on a cluster 118 may continue to be able to scale using the fallback capacity provider 112 despite the primary capacity provider 110 experiencing a failure or otherwise being unable to provision capacity. In some instances, once the primary capacity provider 110 is again able to provision capacity (e.g., fault has cleared), the primary capacity provider 110 may take over provisioning capacity for the cluster 118 and the fallback capacity provider 112 may quit provisioning capacity and return to monitoring the capacity to detect issues.

In some examples, the container-management service 104 may select a fallback capacity provider 112 that provisions capacity in a different availability zone, and/or region, than the primary capacity provider 110. Thus, if the primary capacity provider 110 is failing to provision capacity in one region or availability zone of a computing infrastructure 114, the container-management service 104 may instruct the fallback capacity provider 112 to provision capacity in a different region or availability zone.

In the example a cloud computing system 102, the users 106 may have created user accounts with the cloud provider to utilize the resources of the cloud computing system 102. The users 106 may utilize their devices 108 to communicate over one or more networks 126 (e.g., WANs, PANs, LANs, etc.) with the cloud computing system 102. The user devices 108 may comprise any type of computing device configured to communicate over network(s) 126, such as mobile phones, tablets, laptop computers, desktop computers, televisions, servers, and/or any other type of computing device. The users 106 (e.g., network administrators, organization employees, etc.) may interact with the cloud computing system 102, via their user account and/or one or more user portals (e.g., web console, command line interface (CLI), application programming interface (API), etc.).

Generally, the container-management service 104, and components thereof, may comprise software, firmware, and/or other logic that is supported one computing device, or across more computing devices in the cloud computing system 102. Additionally, the container-management service 104 may comprise a system of other devices. The techniques described herein are generally described with respect to a cloud provider network, such as a cloud provider network or system. However, the techniques are generally applicable for any network, such as on-premises networks, hybrid networks, and so forth.

Generally, the primary capacity provider(s) 110 and fallback capacity providers 112 have different provisioning paths, and thus different availability postures and failure modes, to ensure resiliency in providing capacity for containerized services. That is, a fallback capacity provider 112 may be selected, or determined as suitable, as a failover for a primary capacity provider 110 because a same fault will not affect the provisioning paths of both providers.

The cloud computing system 102 may include one or more hardware processors (processors), one or more devices, configured to execute one or more stored instructions. The processor(s) may comprise one or more cores. Further, the cloud computing system 102 may include one or more network interfaces configured to provide communications between the cloud computing system 102 and other devices, such as the user device(s), and/or other systems or devices in the cloud computing system 102 and/or remote from the cloud computing system 102. The network interfaces may include devices configured to couple to personal area networks (PANs), wired and wireless local area networks (LANs), wired and wireless wide area networks (WANs), and so forth.

The cloud computing system 102 may also include computer-readable media that stores various executable components (e.g., software-based components, firmware-based components, etc.). In addition to various components discussed in FIG. 1, the computer-readable-media may further store components to implement functionality described herein. While not illustrated, the computer-readable media may store one or more operating systems utilized to control the operation of the one or more devices that comprise the cloud computing system 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the cloud computing system 102 may include a data store, or storage, which may comprise one, or multiple, repositories or other storage locations for persistently storing and managing collections of data such as databases, simple files, binary, and/or any other data. The storage may include one or more storage locations that may be managed by one or more database management systems.

The computer-readable media 206 may store portions, or components, of the container-management service, the primary capacity provider(s) 110, the fallback capacity provider 112, etc., described herein.

To utilize the services provided by the cloud computing system 102, the users 106 may register for an account with the cloud computing system 102. For instance, users 106 may utilize a user device to interact with an identity and access management (IAM) service that allows the users 106 to create user accounts with the cloud computing system 102. Generally, the IAM service may enable the users 106 to manage their network infrastructures remotely, and interact with at least the container-management service 104. Generally, the different user accounts can assume different roles, or sets or permissions/credentials, that allow network users 106 to perform different actions, and be restricted from performing some actions.

The computer-readable media may be used to store and retrieve information, such as program modules, data structures, or other data. It should be appreciated by those skilled in the art that computer-readable storage media is any available media that provides for the non-transitory storage of data and that can be accessed by the cloud computing system 102. In some examples, the operations performed by the cloud computing system 102, and or any components included therein, may be supported by one or more server devices. Stated otherwise, some or all of the operations performed by the cloud computing system 102, and or any components included therein, may be performed by one or more computer devices operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 2A:
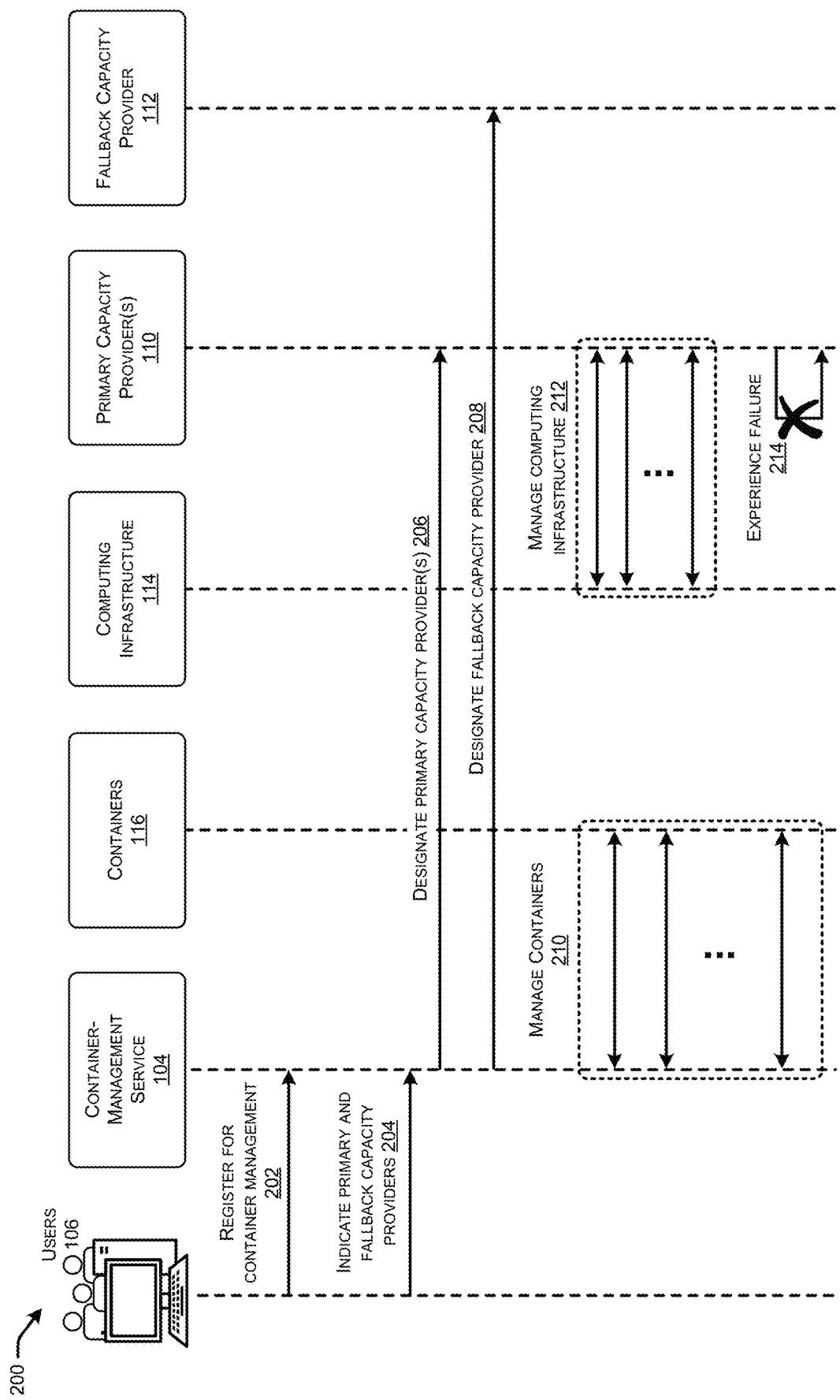
FIGS. 2A and 2B collectively illustrate a sequence diagram of an example process for a fallback capacity provider to provision infrastructure capacity for containers running a service in a cloud computing system when a primary capacity provider experiences a failure.
Figure 2B:
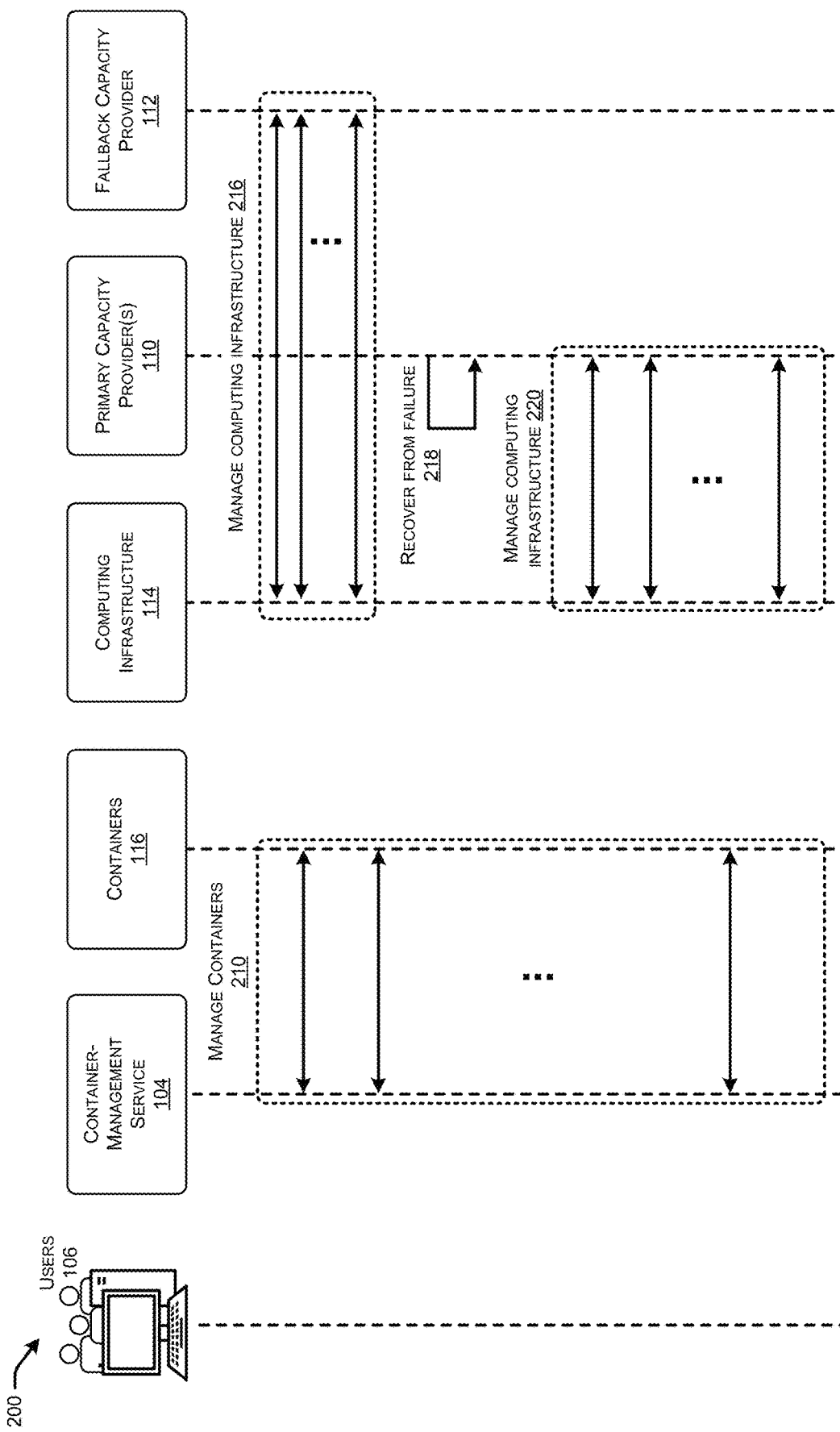

FIGS. 2A and 2B collectively illustrate a sequence diagram 200 of an example process for a fallback capacity provider 112 provisions infrastructure capacity for containers 116 running a service 122 in a cloud system 102 when a primary capacity provider 110 experiences a failure.

At 202, a user 106 may register for a container-management service 104 to manage containers on behalf of the user 106. For instance, the user 106 may request that the container-management service manage the containers needed and used to support a service 122 and/or tasks 120 of the user 106.

At 204, the user 106 may indicate primary and fallback capacity providers 110/112. For instance, the user 106 may interact with a console 128 to manually select the primary and fallback capacity providers 110/112.

At 206, the container-management service 104 may designate one or more primary capacity providers 110, such as by assigning the primary capacity providers 110, to a cluster 118. Similarly, at 208 the container-management service 104 may designate a fallback capacity provider 112, such as by assigning the provider 112, to the cluster 118.

At 210, the container-management service 104 may manage the containers 116 for the service 122 running thereon. For instance, the container-management service 104 may launch containers to scale up compute, stop running containers 116 if the service has a decrease in activity, and so forth.

At 212, and at least partly during 210, the primary capacity provider(s) 110 may manage the computing infrastructure 114 supporting the containers 116 of the cluster 118. For instance, the primary capacity provider(s) 110 may provision capacity in response to increases in demand, may decrease capacity as demand lessens, and may perform other management operations.

At 214, the primary capacity provider 110 may experience a failure. In some instances, experiencing a failure is a situation where the primary capacity provider 110 has a failure in the provisioning path such that it is unable to provision additional capacity. In other examples, experiencing a failure may include having a lack of computing resources available of a particular type necessary. For instance, the service 122 may require a particular resource, such as GPU, and the primary capacity provider(s) 110 may have an unavailability of compute instances that provide GPU to support the service 122.

At 216, the fallback capacity provider 112 may manage the computing infrastructure 114 that is supporting the service 122 and/or cluster 118. For instance, the fallback capacity provider 112 may provision capacity of a different type than the primary capacity provider 110 to support the cluster 118 as it scales.

At 218, the primary capacity provider 110 may recover from the failure, or otherwise be able to provision capacity to support the cluster 118 and/or service 118. For instance, the provisioning path of the primary capacity provider 110 may recover, or the primary capacity provider 110 may otherwise be able to provision capacity of a type required by the cluster 118. In some instances, the container-management service 104 and/or another control plane system of the cloud computing system 102 may detect that the primary capacity provider 110 is available to provision compute capacity. At 220, the primary capacity provider 110 may take over management again and begin managing the computing infrastructure 114.

Figure 3:
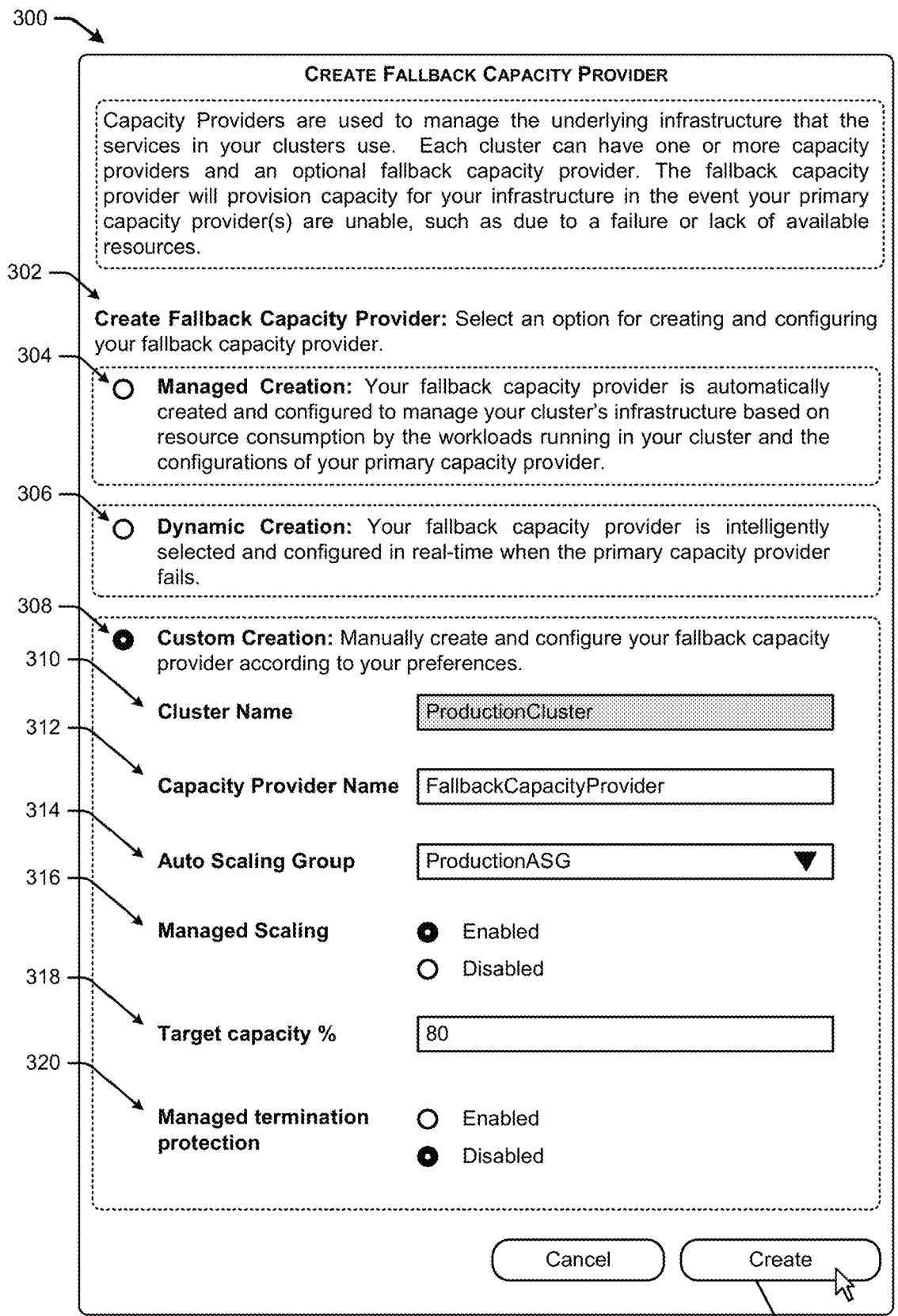
FIG. 3 illustrates a user interface through which a user of a container-management service can create a fallback capacity provider that acts as a failover for a primary capacity provider.

FIG. 3 illustrates a user interface (UI) 300 through which a user 106 of a container-management service 104 can create a fallback capacity provider 112 that acts as a failover for a primary capacity provider 110.

The UI 300 includes a create fallback capacity provider field 302 through which the user 106 may interact to create a fallback capacity provider 112. In the field, the user 106 may select a managed creation option 304 where the user 106 requests that the container-management service 104 automatically creates and configures the fallback capacity provider for their cluster 118. As described in more detail with respect to FIG. 6, the container-management service 104 may collect and analyze utilization data indicating usage of computing resources by the containers 116 that run on the cluster 118. Additionally, or alternatively, the container-management service 104 may determine configurations or other parameters of the primary capacity provider 110 selected by the user 106 for the cluster 118. The container-management service 104 may then determine a suitable or optimal fallback capacity provider 112 for the cluster 118 based at least in part on the computing resource usage and/or parameters of the primary capacity provider 110.

The UI 300 may further include a dynamic creation option 306 that the user 106 may select to have the container-management service 104 dynamically, and intelligently, select a fallback capacity provider 112. For instance, the container-management service 104 may determine, in real-time or near real-time, a fallback capacity provider 112 that is suitable or optimal for managing the computing infrastructure 114.

The UI 300 may further include a customer creation option 308, which was selected by the user 106 in this example, through which the user 106 is able to create or select a fallback capacity provider 112 of their choosing. As shown, the user 106 may input various information for the fallback capacity provider 112, such as a name of cluster 310 with which the fallback capacity provider 112 is to be assigned, a capacity provider name 312 for the fallback capacity provider 112, an auto scaling group 314 for the fallback capacity provider 112, a selectable option for managed scaling 316, a target capacity percentage 318 (e.g., percentage of utilization at which compute instances are scaled), and a managed termination protection option 320. The user 106 may then select the creation option 322 to create the fallback capacity provider 112.

FIG. 4 illustrates a user interface 400 through which a user 106 of a container-management service 104 can assign a fallback capacity provider 112 to act as a failover to provision infrastructure capacity for a service 122.

The UI 400 includes an overview field 402 that explains the service 122 the user 106 is creating and provides a description of how the service 122 works. Further, the UI 400 includes a task definition option 404 drop down menu that is usable by the user 106 to indicate a task that is included in the service 122. Further, the UI 400 includes a capacity provider strategy 406 through which the user 106 may define a capacity provider strategy 130. Generally, a capacity provider strategy 130 is specified when creating a service or running a standalone task when the default capacity provider strategy 130 for a cluster 118 does not meet the user's 106 needs. A capacity provider 110/112 can be associated with a cluster 118 either during cluster 118 creation or after a cluster 118 has been created. Although illustrated as having a single fallback capacity provider 112, each cluster 118 may have multiple fallback capacity providers 112. In some examples, each primary provider 110 may have its own fallback capacity provider(s) 112, and in some instances, the primary capacity providers 110 may share one or more fallback capacity providers 112.

As shown, the capacity provider strategy 130 consists of one or more capacity providers, and an optional fallback provider. An optional base and weight value may be specified for finer control of a capacity provider 110. The base value designates how many tasks, at a minimum, to run on the specified capacity provider 110. Only one capacity provider 110 in a capacity provider strategy 130 can have a base defined. The weight value designates the relative percentage of the total number of launched tasks 120 that should use the specified capacity provider 110. In this example, the strategy has two capacity providers 110, and one has a weight of 1 and one has a weight of 4. Thus, when the base is satisfied (e.g., primary provider 1 has a task 120 running), the tasks 120 will be split at a ratio of 4 to 1 across the two capacity providers 110. Stated otherwise, when the user 106 specifies a weight of 1 for capacity provider A and a weight of 4 for capacity provider B, then for every one task that is run using capacity provider A, four tasks would use capacity provider B.

The UI 400 may further include a cluster field 408 through which a user 106 may indicate the cluster 118 to which the service 122 belongs, and a service name 410 for the service 122. Further, the UI 400 may include a number of tasks 412 that are permitted to run for the service 122, a minimum health percent 414 allowed for the service 122, and a maximum percent 416 for the service 122. Once the user 106 has finished defining their service 122, the user 106 may select an apply option 418 to configure the service 122.

FIG. 5 illustrates a representation of example tiers supporting a service 122 that utilizes a fallback capacity provider 112 as a failover to provide infrastructure capacity when a primary capacity provider 110 is unable.

As shown, an instance/task runtime tier 502 illustrates compute representations 508 of compute instances 124 of a computing infrastructure 114 supporting a service 122. As illustrated, a compute representation 508A illustrates a compute-based instance (e.g., compute optimized VM) that is running several machine0learning (ML) service tasks and has 25% of the capacity available. The compute representation 508A also indicates a capacity provider that is used to manage the compute representation 508A. Further, a compute representation 508B is a memory-based instance that is running several web-service tasks and is 80% free, and is managed by a different capacity provider than compute representation 508A. Finally, a compute representation 508C is illustrated as running some of the ML service tasks and is a general, xlarge instance. In some instances, the general/xlarge instance 508C is selected at least partly because the compute representation 508A is a CPU_xlarge instance and the compute representation 508B mem_large instance, and the gen_xlarge is provisioned with enough resources to run the tasks normally launched on the compute representations 508A and 508B. The compute representation 508C is launched and managed by a fallback capacity provider 112 in response to a primary capacity provider 110 being unable to provision a compute representation 508A.

As shown, a service configuration tier 504 illustrates compute representations 508 of compute instances 124 of a computing infrastructure 114 supporting a service 122. As shown a service representation 510A represents a service A called "MLService." The service representation 510A further indicates placement constraints for running underlying tasks of the service A, in this case, an indication of an attribute of the service A as being a CPU workload type. The service representation 510A further indicates that a desired number of tasks 120 for the service A 122 is 30, and the service representation 510A may further indicate an autoscaling metric if desired by a user 106. Similarly, a service representation 510B represents a service B called "httpd_service." The service representation 510B further indicates placement constraints for running underlying tasks of the service A, in this case, an indication of an attribute of the service B as being a memory-heavy workload type. The service representation 510B further indicates that a desired number of tasks 120 for the service B 122 is 100, and the service representation 510B may further indicate an autoscaling metric if desired by a user 106.

As shown, a cluster configuration tier 508 illustrates a representation of a cluster 514 that has an associated capacity selection strategy 516 that is used to launch containers for supporting tasks 120 of a service 122. As shown, the cluster 514 has first attributes 512B including indications of autoscaling groups, resource types (e.g., VM instance types 124), and minimum/maximum/desired amounts of tasks 120 to run for the particular service. further, the cluster 514 has second attributes 512A that indicate capacity providers 110/112 used to provision and manage the difference VM instance types 124, as well as attributes of the capacity launched by the respective capacity providers 110/112 (e.g., CPU capacity, memory capacity, general capacity, etc.). The cluster 514 may use a selection strategy 516 to determine which capacity providers 110/112 provision capacity, and according to what strategy they provision the capacity (e.g., base values, weight values, fallback capacity provider 112, etc.).

Figure 6:
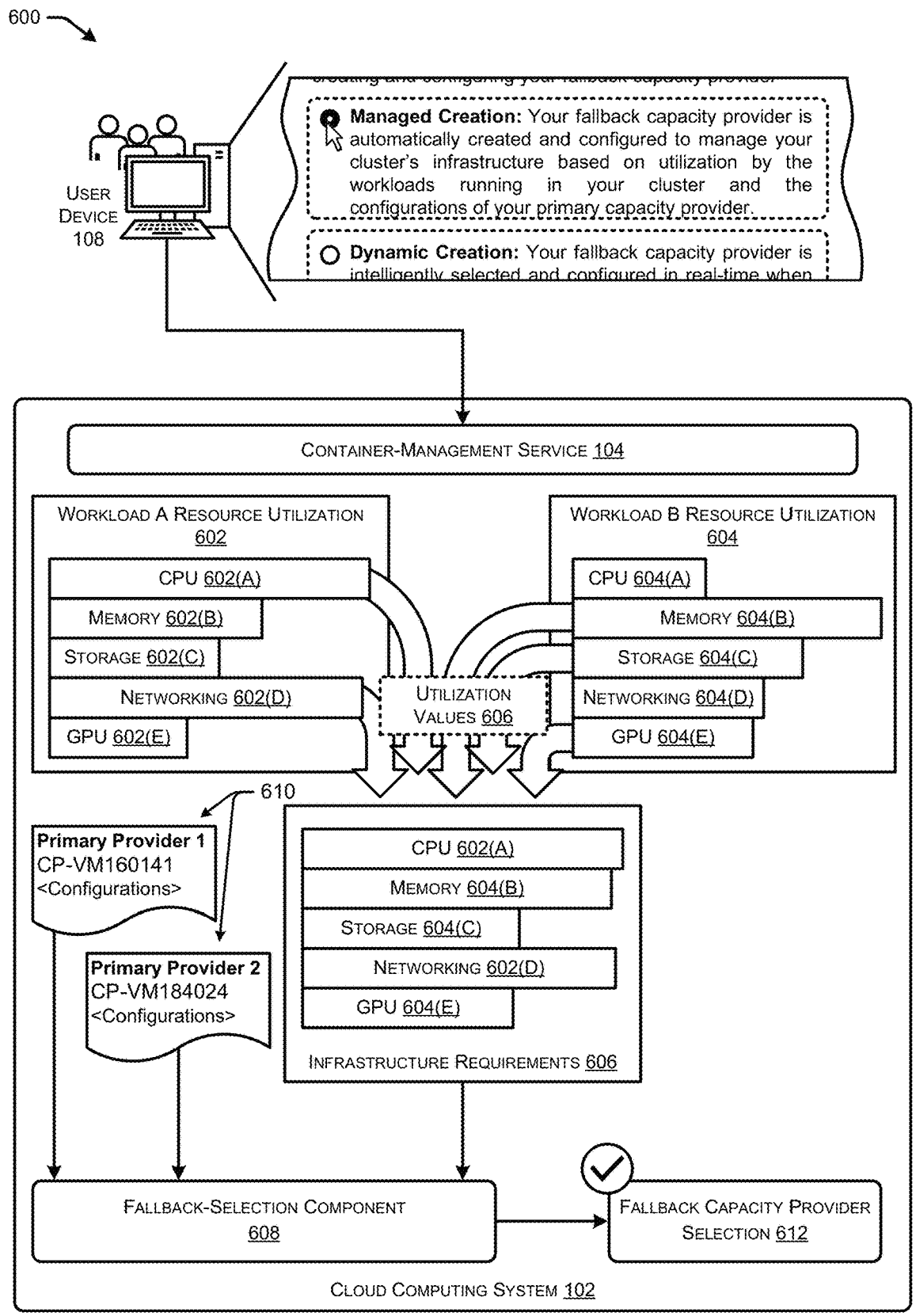
FIG. 6 illustrates a system-architecture diagram of an example process for a container-management service to determine and select a fallback capacity provider on behalf of a user that is running a service in a cloud computing system.

FIG. 6 illustrates a system-architecture diagram 600 of an example process for a container-management service 104 to determine and select a fallback capacity provider 112 on behalf of a user 106 that is running a service 122 in a cloud computing system 102.

As shown, a user 106 of a user device 108 may have selected the managed creation option (e.g., option 304 in FIG. 3). When the user 106 selections the managed creation option, the user 106 requests that the container-management service 104 automatically create and configure the fallback capacity provider for their cluster 118. The container-management service 104 may collect and analyze workload utilization data 602 indicating usage of computing resources by the containers 116 that run on the cluster 118. As shown, the workload resource utilization data 602 may be collected for two or more workloads (e.g., tasks 120) running on containers 116 of the cluster 118. The workload resource utilization data 602 may indicate average values 606 of utilization, maximum values 606 of utilization, minimum values 606 of utilization, and/or any other utilization values 606. As shown, the utilization values 606 may indicate amounts of computing resources consumed by the workloads, such as CPU, memory, storage, networking, and potentially GPU (graphics processing unit). The utilization values 606 may be used to determine overall infrastructure requirements 606 for supporting the different workloads in the cluster 118. In the illustrated examples, the infrastructure requirements are determined based on maximum utilization values 606 (e.g., maximum at a point in time, maximum over time, etc.) across the multiple workloads. In this way, the underlying infrastructure will be selected such that it can support all of the workloads provisioned in the cluster 118. The infrastructure requirements 606 may be provided to a fallback-selection component 608 configured to select a fallback capacity provider 112 for a cluster 118 using at least the infrastructure requirements 606.

Further, the fallback-selection component 608 may receive configuration data 610 for primary capacity providers 110 that were selected for the cluster 110. The configuration data 610 may indicate various information associated with the primary capacity providers, such as a type of compute platform provisioned by the primary capacity providers 110, autoscaling groups or policies, and/or other data.

The fallback-selection component 608 (which may be associated with or included in the container-management service 104) may then determine a suitable or optimal fallback capacity provider 112 for the cluster 118 based at least in part on the infrastructure requirements 606 and/or the configuration data 610 of the primary capacity provider(s) 110. For instance, the fallback-selection component 608 may analyze the infrastructure requirements and determine amounts of computing resources consumed by workloads in the cluster 118 (e.g., CPU consumed, memory consumed, storage consumed, etc.). The fallback-selection component 608 may use the infrastructure requirements 606 to select a suitable fallback capacity provider 112, and/or configurations for the fallback capacity provider 112, for cluster 118 of the user 106 such that the fallback capacity provider 112 is capable of provisioning compute instance types 124 that have sufficient computing resources to fulfill the infrastructure requirements 606. Further, the fallback-selection component 608 may use the configuration data 610 of the primary capacity provider(s) 110 as a source of information for selecting a suitable fallback capacity provider.

As an illustrative example of selecting a fallback capacity provider 112, the fallback-selection component 608 may determine that the infrastructure requirements 606 for the tasks 120 or workloads require a VM instance 124 type that is allocated 8 vCPUs, 32 gibibytes (GiB) of memory, and 10 Gbps of network bandwidth. Further, the fallback-selection component 608 may determine that the configuration data 610 indicates that the primary capacity providers 110 are serverless compute platforms that supply compute infrastructure that is highly available, and determine that a fallback capacity provider 112 that provides interruptible compute infrastructure would not be suitable for the cluster 118. In such examples, the fallback-selection component 608 may select a scalable, highly available VM instance platform as the fallback capacity provider 112 and output a fallback capacity provider selection 612. Further, the fallback-selection component 608 may configure the fallback capacity provider 112 to provision compute instances 114 that provide at least the required amount of computing resources used by the cluster 118 and tasks 120.

FIGS. 7A, 7B, 8, and 9 illustrate flow diagrams of example methods 700, 800, and 900 that illustrate aspects of the functions performed at least partly by the cloud computing system 102 as described in this disclosure. The logical operations described herein with respect to FIGS. 7A, 7B, 8, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7A, 7B, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7A:
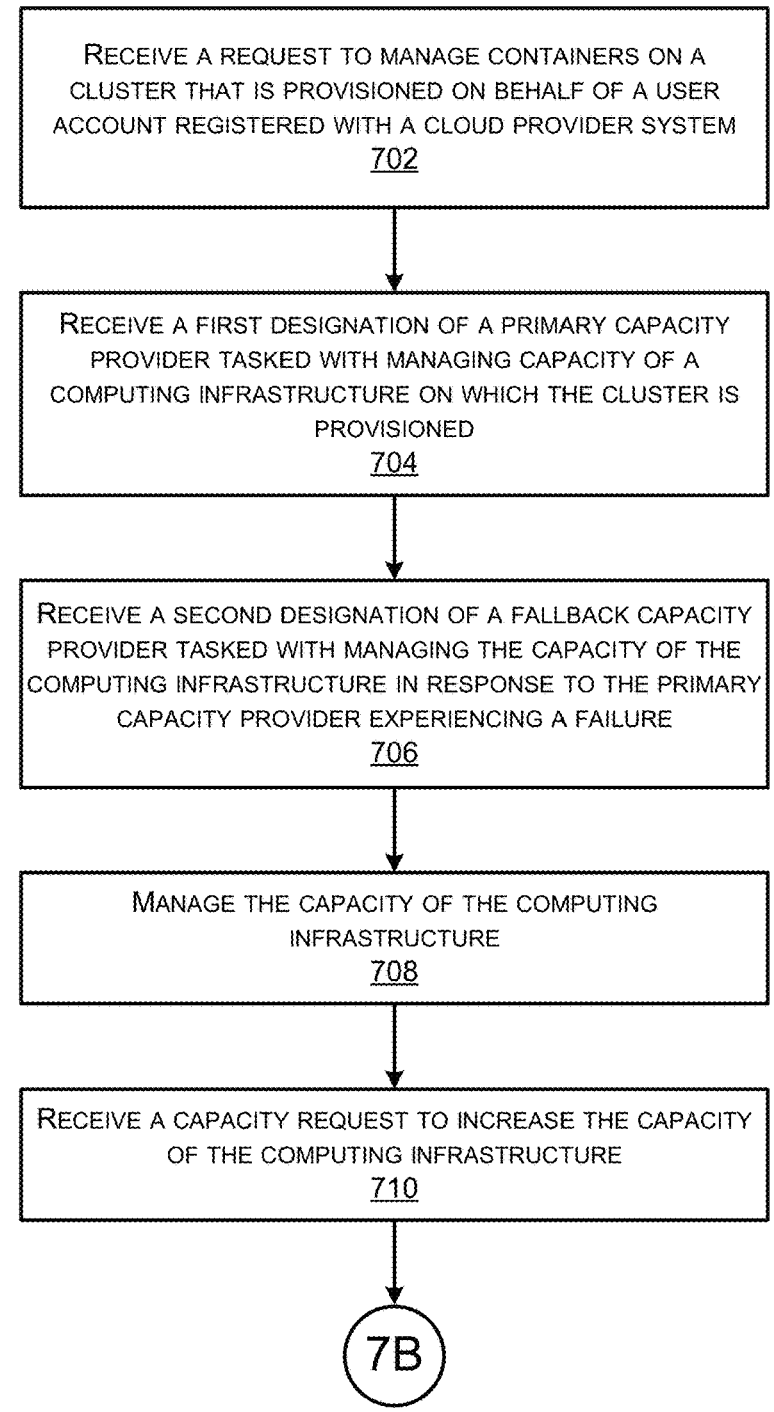
FIGS. 7A and 7B collectively illustrate a flow diagram of an example method for a container-management service to manage containers on a cluster, a primary capacity provider to initially manage computing infrastructure supporting the cluster, and a fallback capacity provider to service a capacity request in response to the primary capacity provider experiencing a failure.
Figure 7B:
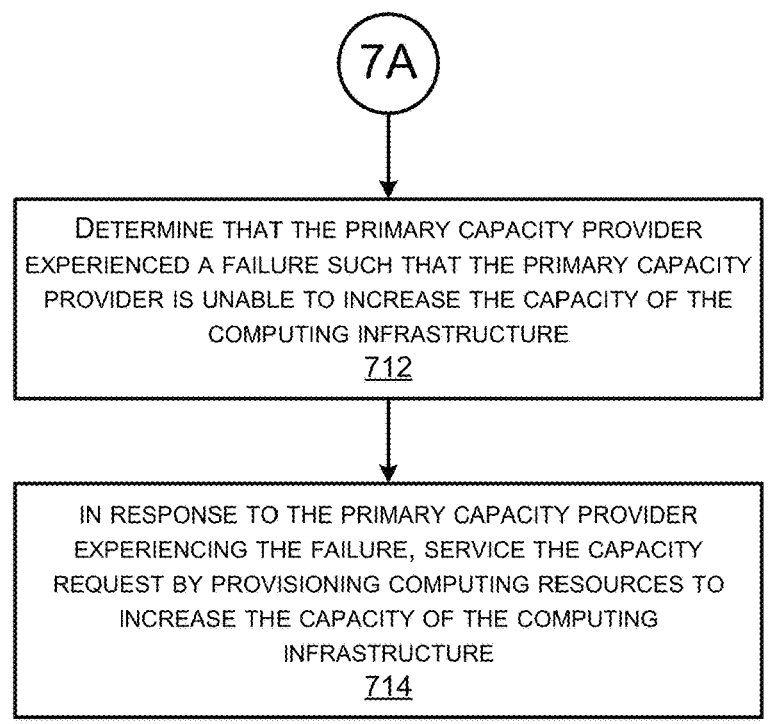

FIGS. 7A and 7B collectively illustrate a flow diagram of an example method for a container-management service to manage containers on a cluster, a primary capacity provider to initially manage computing infrastructure supporting the cluster, and a fallback capacity provider to service a capacity request in response to the primary capacity provider experiencing a failure.

At 702, a container-management service may receive a request to manage containers on a cluster that is provisioned on behalf of a user account registered with the cloud provider system. For instance, the container-management service 104 may receive a request from the user account to enroll for use of the container-management service 104.

At 704, the container-management service may receive a first designation of a primary capacity provider tasked with managing capacity of a computing infrastructure on which the cluster is provisioned. In one example, the user 106 may manually designate or specify a primary capacity provider 110 that is to provision capacity into the computing infrastructure 114 supporting the cluster 118 of the user 106.

At 706 the container-management service may receive a second designation of a fallback capacity provider tasked with managing the capacity of the computing infrastructure in response to the primary capacity provider experiencing a failure. For instance, the user 106 may manually specify the fallback capacity provider 112 in a console or user interface.

At 708, a primary capacity provider may manage the capacity of the computing infrastructure. For instance, the primary capacity provider 110 may provision capacity in response to receiving capacity requests from the container-management service 104.

At 710, the primary capacity provider may receive a capacity request to increase the capacity of the computing infrastructure. For instance, the cluster 118 may need additional capacity as tasks 120 and/or services 122 scale, and the container-management service 104 may send a capacity request to the primary capacity provider 110.

At 714, the container-management service and/or fallback capacity provider may determine that the primary capacity provider experienced a failure such that the primary capacity provider is unable to increase the capacity of the computing infrastructure. The container-management service 104, the fallback capacity provider 112, and/or another service may detect or determine that the primary capacity provider experienced the failure.

At 716, the fallback capacity provider may, in response to the primary capacity provider experiencing the failure, service the capacity request by provisioning computing resources to increase the capacity of the computing infrastructure. That is, the fallback capacity provider 112 may take over the tasks of provisioning capacity for the computing infrastructure 114.

Figure 8:
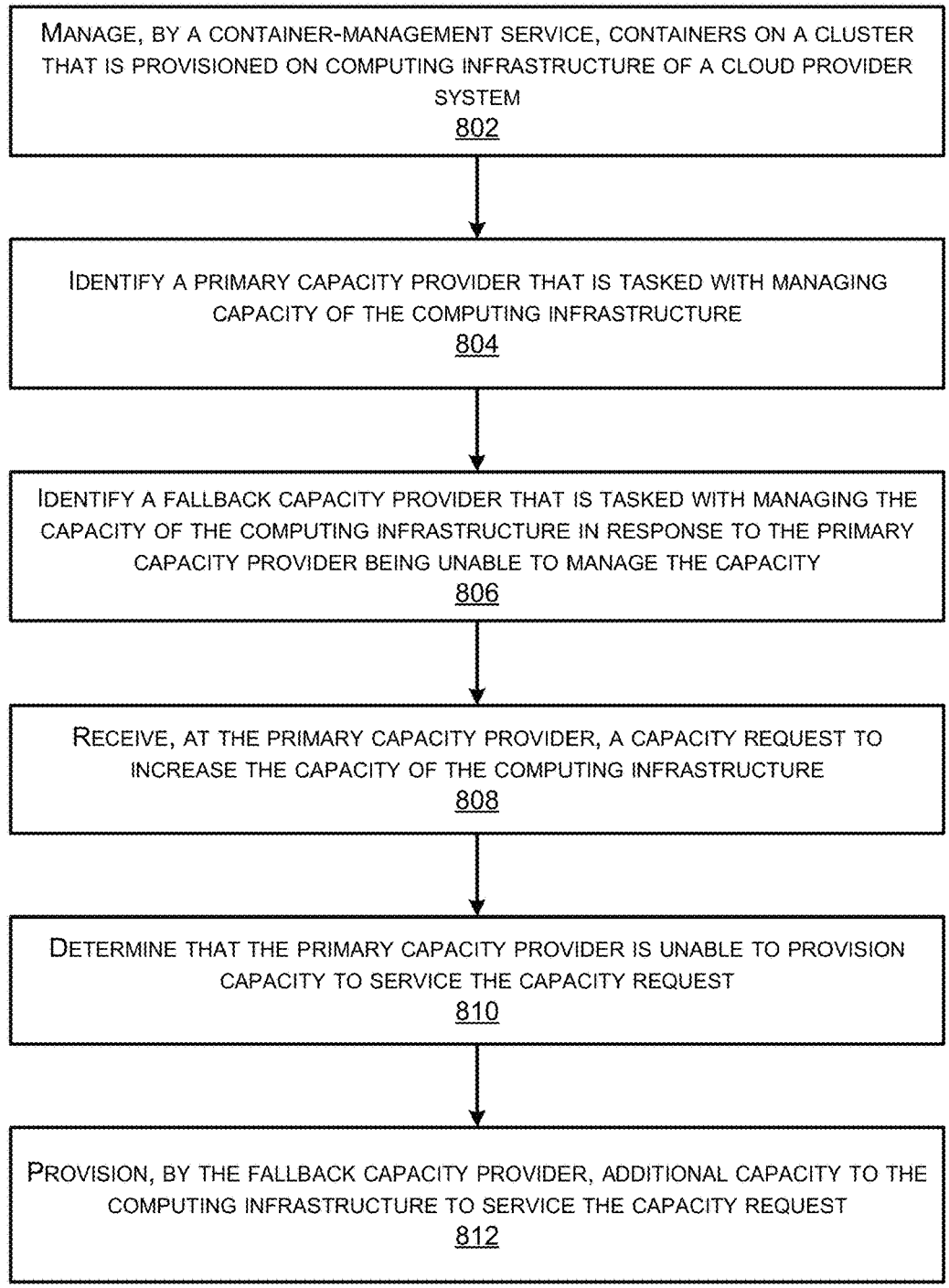
FIG. 8 illustrates a flow diagram of an example method for a container-management service to manage containers on a cluster, and a fallback capacity provider to act as a failover for provisioning capacity in a computing infrastructure when a primary capacity provider is unable.

FIG. 8 illustrates a flow diagram of an example method for a container-management service to manage containers on a cluster, and a fallback capacity provider to act as a failover for provisioning capacity in a computing infrastructure when a primary capacity provider is unable.

At 802, a container-management service may manage containers on a cluster that is provisioned on computing infrastructure of a cloud provider system. For instance, the container-management service 104 may scale up, scale down, and perform other management functions for containers 116 on a cluster 118.

At 804, the container-management service may identify a primary capacity provider that is tasked with managing capacity of the computing infrastructure. In some instances, the user 106 many manually indicate the primary capacity provider 110, and in other instances, the container-management service 104 may identify or determine a primary capacity provider 110 for the user 106.

At 806, the container-management service may identify a fallback capacity provider that is tasked with managing the capacity of the computing infrastructure in response to the primary capacity provider being unable to manage the capacity. In some instances, the user 106 many manually indicate the fallback capacity provider 112, and in other instances, the container-management service 104 may identify or determine a fallback capacity provider 112 for the user 106.

At 808, the primary capacity provider may receive a capacity request to increase the capacity of the computing infrastructure. For instance, the container-management service 104 may send a request for additional capacity to the primary capacity provider 110.

At 810, the container-management service and/or fallback capacity provider may determine that the primary capacity provider is unable to provision capacity to service the capacity request. There may be various events indicating that the primary capacity provider 110 is unable to handle the capacity request, such as the primary capacity provider 110 experiencing a failure, the primary capacity provider 110 having less than a threshold amount of a resource type, the primary capacity provider 110 not serving a capacity request in a threshold period of time, the container-management service 104 deciding to proactively provision capacity using the fallback capacity provider 112, and so forth.

At 812, the fallback capacity provider may provision additional capacity to the computing infrastructure to service the capacity request. For instance, the fallback capacity provider 110 may begin servicing capacity requests to scale capacity of the computing infrastructure 114.

Figure 9:
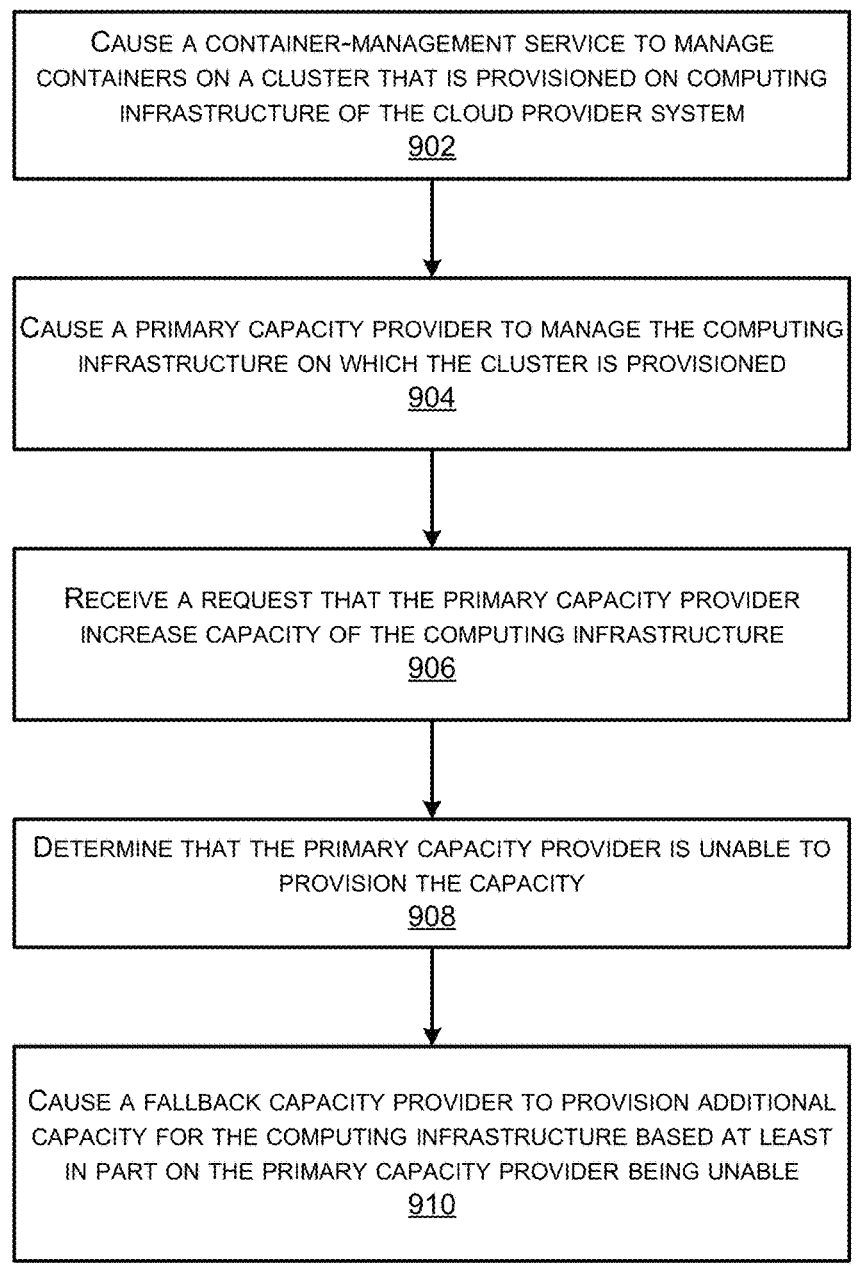
FIG. 9 illustrates a flow diagram of an example method for a container-management service to manage containers on a cluster, and a fallback capacity provider to act as a failover to perform a management operation on a computing infrastructure when a primary capacity provider is unable.

FIG. 9 illustrates a flow diagram of an example method for a container-management service to manage containers on a cluster, and a fallback capacity provider to act as a failover to perform a management operation on a computing infrastructure when a primary capacity provider is unable.

At 902, a cloud computing system may cause a container-management service to manage containers on a cluster that is provisioned on computing infrastructure of the cloud provider system. For instance, the container-management service 104 may scale up, scale down, and perform other management functions for containers 116 on a cluster 118.

At 904, the cloud computing system may cause a primary capacity provider to manage the computing infrastructure on which the cluster is provisioned. The primary capacity provider 110 may provision capacity in response to receiving requests from the container-management service 104.

At 906, the cloud computing system may send a request to the primary capacity provider to increase capacity of the computing infrastructure. For instance, the container-management service 104 may send a request for additional capacity to the primary capacity provider 110.

At 908, the cloud computing system may determine that the primary capacity provider is unable to provision the capacity. There may be various events indicating that the primary capacity provider 110 is unable to handle the capacity request, such as the primary capacity provider 110 experiencing a failure, the primary capacity provider 110 having less than a threshold amount of a resource type, the primary capacity provider 110 not serving a capacity request in a threshold period of time, the container-management service 104 deciding to proactively provision capacity using the fallback capacity provider 112, and so forth.

At 910, a cloud computing system may cause a fallback capacity provider to provision additional capacity for the computing infrastructure based at least in part on the primary capacity provider being unable. For instance, the fallback capacity provider 110 may begin servicing capacity requests to scale capacity of the computing infrastructure 114.

Figure 10:
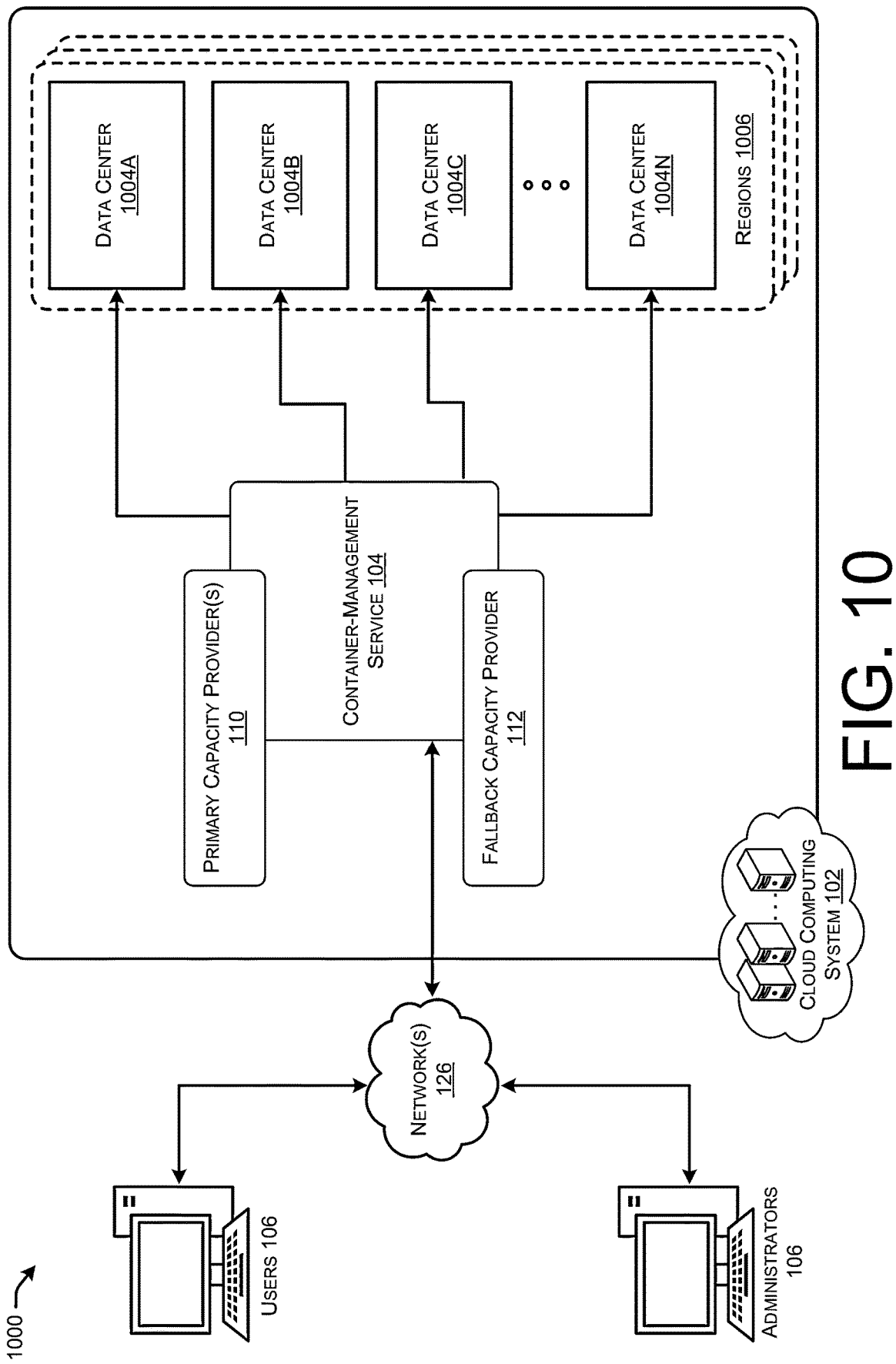
FIG. 10 is a system and network diagram that shows an illustrative operating environment that includes data centers of a cloud provider network that can be configured to implement aspects of the functionality described herein.

FIG. 10 is a system and network diagram 1000 that shows an illustrative operating environment that includes data centers 1004 in one or more regions 1006 of a cloud computing system 102 that can be configured to implement aspects of the functionality described herein. The cloud computing system 102 can provide computing resources, like VM instances and storage, on a permanent or an as-needed basis. Among other types of functionality, the computing resources provided by the cloud computing system 102 may be utilized to implement the various services described above. As also discussed above, the computing resources provided by the cloud computing system 102 can include various types of computing resources, such as data processing resources like VM instances, data storage resources, networking resources, data communication resources, network services, and the like.

Each type of computing resource provided by the cloud computing system 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The cloud computing system 102 can also be configured to provide other types of computing resources not mentioned specifically herein.

The computing resources provided by the cloud computing system 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1008. One illustrative embodiment for a data center 1004 that can be utilized to implement the technologies disclosed herein will be described below with regard to FIG. 11.

The users 106, such as administrators 106, of the user devices 108 that utilize the cloud computing system 102 may access the computing resources provided by the cloud computing system 102 over any wired and/or wireless network(s) 108, which can be a wide area communication network ("WAN"), such as the Internet, an intranet or an Internet service provider ("ISP") network or a combination of such networks. For example, and without limitation, a user device operated by a user 106 of the cloud computing system 102 may be utilized to access the cloud computing system 102 by way of the network(s) 126. It should be appreciated that a local-area network ("LAN"), the Internet, or any other networking topology known in the art that connects the data centers 1004 to remote clients and other users can be utilized. It should also be appreciated that combinations of such networks can also be utilized.

Figure 11:
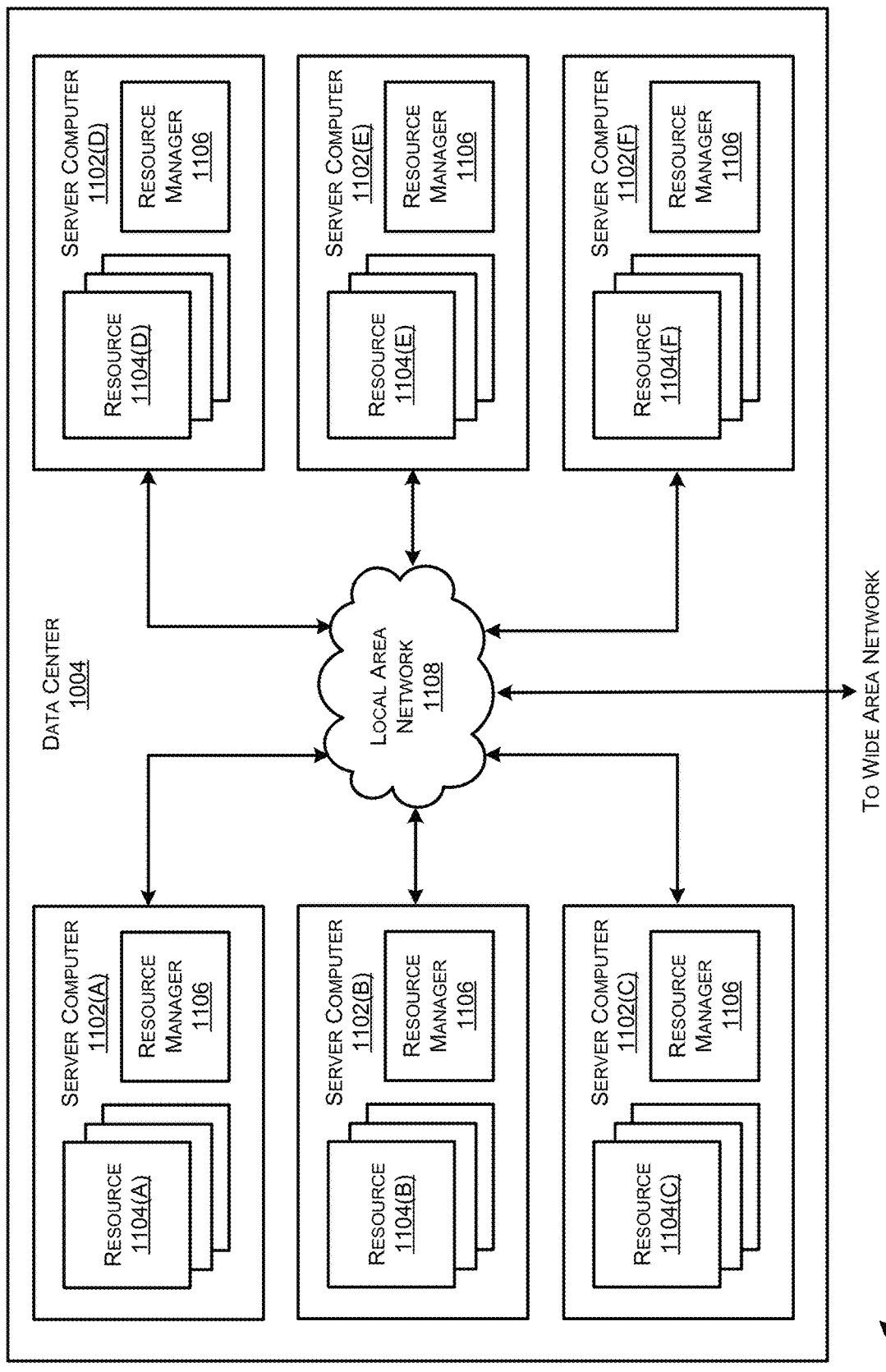
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the cloud computing system 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1104A-1104N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

Figure 12:
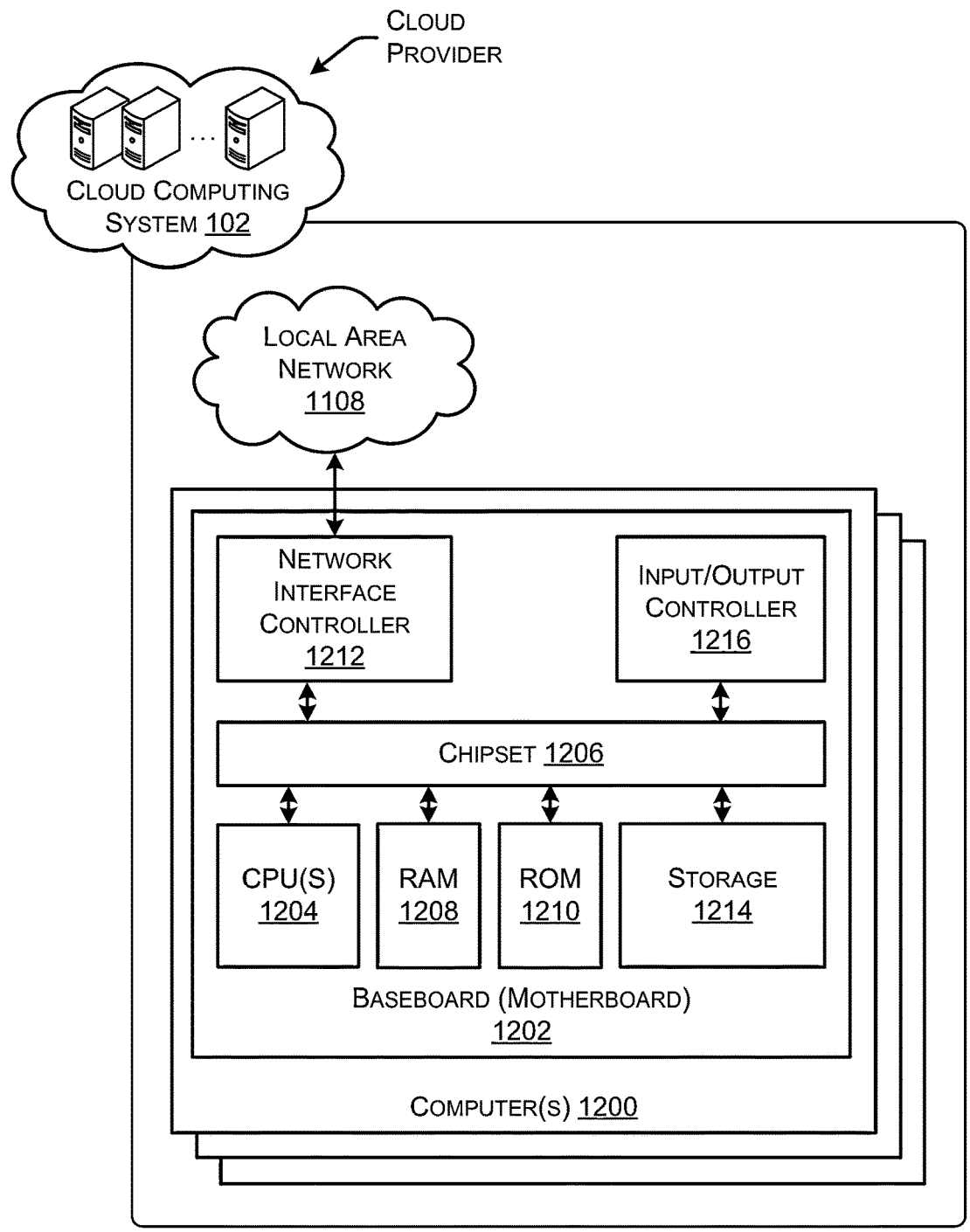
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1208. The chipset 1206 can include functionality for providing network connectivity through a network interface controller (NIC) 1212, such as a gigabit Ethernet adapter. The NIC 1212 is capable of connecting the computer 1200 to other computing devices over the network 1208 (or 104). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the cloud computing system 102, and or any components included therein, may be supported by one or more devices similar to computer 1200. Stated otherwise, some or all of the operations performed by the cloud computing system 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A cloud computing system, comprising:
one or more processors; and
memory storing computer-executable instructions that, when executed, cause the one or more processors to perform operations;
receiving a request to manage containers on a cluster that is provisioned on behalf of a user account registered with the cloud provider system;
receiving a first designation of a primary capacity provider tasked with managing capacity of a computing infrastructure on which the cluster is provisioned;
receiving a second designation of a fallback capacity provider tasked with managing the capacity of the computing infrastructure in response to the primary capacity provider experiencing a failure;
managing, by the primary capacity provider, the capacity of the computing infrastructure;
receiving a capacity request to increase the capacity of the computing infrastructure;
determining that the primary capacity provider experienced a failure such that the primary capacity provider is unable to increase the capacity of the computing infrastructure; and
in response to the primary capacity provider experiencing the failure, servicing the capacity request, by the fallback capacity provider, by provisioning computing resources to increase the capacity of the computing infrastructure.

2. The cloud computing system of claim 1, the first operations further comprising:
determining that the failure experienced by the primary capacity provider has cleared such that the primary capacity provider is able to provision computing resources; and
causing the primary capacity provider to service subsequent capacity requests.

3. The cloud computing system of claim 1, further comprising, prior to receiving the second designation of the fallback capacity provider:

receiving a third designation of an initial fallback capacity provider that the user account desires to task with managing the capacity of the computing infrastructure in response to the primary capacity provider experiencing a failure;
determining that the initial fallback capacity provider provisions respective computing resources that are insufficient for supporting a workload executing on the cluster; and
prompting the user account to designate a different fallback capacity provider.

4. The cloud computing system of claim 1, wherein:
the primary capacity provider is a serverless compute platform that automates management of the computing infrastructure on behalf of the user account;
the fallback capacity provider is a virtual machine (VM) instance provider that scales the computing infrastructure using VM instances configured by the user account; and
a first provisioning path of the primary capacity provider has a different fault domain than a second provisioning path of the fallback capacity provider such that failures experienced by the primary capacity provider do not affect the fallback capacity provider.

5. A computer-implemented method comprising:
managing, by a container-management service, containers on a cluster that is provisioned on computing infrastructure of a cloud provider system;
identifying a primary capacity provider that is tasked with managing capacity of the computing infrastructure;
identifying a fallback capacity provider that is tasked with managing the capacity of the computing infrastructure in response to the primary capacity provider being unable to manage the capacity;
receiving, at the primary capacity provider, a capacity request to increase the capacity of the computing infrastructure;
determining that the primary capacity provider is unable to provision capacity to service the capacity request; and
provisioning, by the fallback capacity provider, additional capacity to the computing infrastructure to service the capacity request.

6. The computer-implemented method of claim 5, further comprising:
providing a user account associated with the cluster with access to a console through which a user defines a selection strategy according to which the capacity of the computing infrastructure is managed; and
receiving, via the console, user input defining the selection strategy, the user input indicating:
a first user designation of the primary capacity provider;
first configurations according to which the primary capacity provider manages the capacity of the computing infrastructure;
a second user designation of the fallback capacity provider; and
second configurations according to which the fallback capacity provider manages the capacity of the computing infrastructure.

7. The computer-implemented method of claim 5, further comprising:
receiving, from a user account associated with the cluster, a request that the container-management service determine a suitable fallback capacity provider;

determining a utilization characteristic indicating utilization of the computing infrastructure by a workload executing on the cluster;
selecting the fallback capacity provider to manage the capacity based at least in part on:
the utilization characteristic of the workload; and
the fallback capacity provider being suitable as a fallback to manage the capacity.

8. The computer-implemented method of claim 5, further comprising:
determining first capacity requirements for a first workload type that is executing on the cluster;
determining second capacity requirements for a second workload type that is executing on the cluster; and
selecting the fallback capacity provider based at least in part on the fallback capacity provider being capable of provisioning capacity that supports the first capacity requirements and the second capacity requirements.

9. The computer-implemented method of claim 5, further comprising:
determining that the primary capacity provider is able to provision capacity for the computing infrastructure; and
servicing subsequent capacity requests by the primary capacity provider.

10. The computer-implemented method of claim 5, wherein:
the primary capacity provider provisions computing resources in the computing infrastructure according to a first provisioning path;
the fallback capacity provider provisions computing resources in the computing infrastructure according to a second provisioning path;
the first provisioning path has a different fault domain than the second provisioning path such that failures experienced by the primary capacity provider do not affect the fallback capacity provider.

11. The computer-implemented method of claim 5, wherein the primary capacity provider and fallback capacity provider are selected from a set of capacity providers offered by the cloud provider system, the set of capacity providers including at least two of:
a serverless compute platform that is configured to automate management of the computing infrastructure on behalf of a user account;
a scalable virtual machine (VM) instance provider that is configured to scale the computing infrastructure using VM instances configured by the user account;
an on-premises infrastructure provider that is configured to provision on-premises infrastructure to support on-premises containers running on clusters in an on-premises network associated with the user account;
an edge infrastructure provider that is configured to automate management of edge computing infrastructure on which an edge cluster runs; or
an interruption tolerant infrastructure provider that is configured to manage computing infrastructure for containers supporting interruption-tolerant workloads.

12. The computer-implemented method of claim 5, wherein determining that the primary capacity provider is unable to provision the capacity to service the capacity request includes at least one of:
determining that a provisioning path of the primary capacity provider experienced a failure;
determining that a capacity pool of available computing resources managed by the primary capacity provider has fallen below a threshold amount; or
determining that the primary capacity provider did not service the capacity request for a threshold period of time.

13. A cloud provider system, comprising:
one or more processors; and
one or more non-transitory computer-readable media storing computer-executable instructions that, when executed on one or more processors, cause the one or more processors to perform operations comprising:
causing a container-management service to manage containers on a cluster that is provisioned on computing infrastructure of the cloud provider system;
causing a primary capacity provider to manage the computing infrastructure on which the cluster is provisioned;
receiving a request that the primary capacity provider increase capacity of the computing infrastructure;
determining that the primary capacity provider is unable to provision the capacity; and
causing a fallback capacity provider to provision additional capacity for the computing infrastructure based at least in part on the primary capacity provider being unable.

14. The cloud computing system of claim 13, the operations further comprising:
providing a user account associated with the cluster with access to a console through which a user defines a selection strategy according to which capacity of the computing infrastructure is managed; and
receiving, via the console, user input defining the selection strategy, the user input indicating:
a first user designation of the primary capacity provider;
first configurations according to which the primary capacity provider manages the capacity of the computing infrastructure;
a second user designation of the fallback capacity provider; and
second configurations according to which the fallback capacity provider manages the capacity of the computing infrastructure.

15. The cloud computing system of claim 13, the operations further comprising:
receiving, from a user account associated with the cluster, a request that the container-management service determine a suitable fallback capacity provider;
determining a utilization characteristic indicating utilization of the computing infrastructure by a workload executing on the cluster;
selecting the fallback capacity provider based at least in part on:
the utilization characteristic of the workload; and
the fallback capacity provider being suitable as a fallback to manage capacity of the computing infrastructure.

16. The cloud computing system of claim 13, the operations further comprising:
determining first capacity requirements for a first workload type that is executing on the cluster;
determining second capacity requirements for a second workload type that is executing on the cluster; and
selecting the fallback capacity provider based at least in part on the fallback capacity provider being capable of provisioning capacity that supports the first capacity requirements and the second capacity requirements.

17. The cloud computing system of claim 13, the operations further comprising:

determining that the primary capacity provider is able to provision capacity for the computing infrastructure; and causing the primary capacity provider to perform subsequent management operations.

18. The cloud computing system of claim 13, wherein:

the primary capacity provider provisions first computing resources in the computing infrastructure according to a first provisioning path;

the fallback capacity provider provisions second computing resources in the computing infrastructure according to a second provisioning path;

the first provisioning path has a different fault domain than the second provisioning path such that failures experienced by the primary capacity provider do not affect the fallback capacity provider.

19. The cloud computing system of claim 13, wherein the primary capacity provider and fallback capacity provider are selected from a set of capacity providers offered by the cloud provider system, the set of capacity providers including at least two of:

a serverless compute platform that is configured to automate management of the computing infrastructure on behalf of a user account;

a scalable virtual machine (VM) instance provider that is configured to scale the computing infrastructure using VM instances configured by the user account;

an on-premises infrastructure provider that is configured to provision on-premises infrastructure to support on-premises containers running on clusters in an on-premises network associated with the user account;

an edge infrastructure provider that is configured to automate management of edge computing infrastructure on which an edge cluster runs; or an interruption tolerant infrastructure provider that is configured to manage computing infrastructure for containers supporting interruption-tolerant workloads.

20. The cloud computing system of claim 13, wherein determining that the primary capacity provider is unable to perform the management operations includes at least one of:

determining that a provisioning path of the primary capacity provider experienced a failure;

determining that a capacity pool of available computing resources managed by the primary capacity provider has fallen below a threshold amount; or determining that the primary capacity provider did not service a capacity request for a threshold period of time.

* * * * *